(12) United States Patent
Bagshaw

(10) Patent No.: US 6,308,176 B1
(45) Date of Patent: Oct. 23, 2001

(54) ASSOCIATING FILES OF DATA

(75) Inventor: Marcus A. Bagshaw, Chelmsford (GB)

(73) Assignee: The Dialog Corporation plc, London (GB)

(*) Notice: Subject to any disclaimer, the term of this patent is extended or adjusted under 35 U.S.C. 154(b) by 0 days.

(21) Appl. No.: 09/295,292

(22) Filed: Apr. 20, 1999

(30) Foreign Application Priority Data

Apr. 24, 1998 (GB) .................................. 98 08 805

(51) Int. Cl.⁷ .................................................. G06F 17/30
(52) U.S. Cl. ............................. 707/10; 707/3; 707/6; 709/217
(58) Field of Search ..................... 707/1–6, 10; 709/217

(56) References Cited

U.S. PATENT DOCUMENTS 5,604,849 * 2/1997 Artwick et al. ...................... 395/123
5,717,914 * 2/1998 Husick et al. ....................... 395/605
5,748,954 * 5/1998 Mauldin ............................. 395/610

OTHER PUBLICATIONS

Hearst et al, "Subtopic Structuring For Full–Length Document Access" (Jun. 27, 1993). Proceedings of SIGIR '93. Pittsburgh. PA. p. 59–68.*
IBM Technical Disclosure Bulletin; vol. 34, No. 4B; Sep. 1991; Intelligent Library Filter for Office.
Subtopic structureing for Full–Length Document Access; Marti Hearst et al.; Computer Science Division; UC Berkeley; Berkeley, California.
TCS: A Shell for Content–Based Text Categorization; Philip J. Hayes et al.; Carnegie Group; Pittsburge, Pennsylvania.

* cited by examiner

Primary Examiner—Kim Vu
Assistant Examiner—Cam-Y Truong
(74) Attorney, Agent, or Firm—Harness, Dickey & Pierce, P.L.C.

(57) ABSTRACT

Data files are associated with categories by processing said data files in combination with outline files. Large files (221) are divided into a plurality of file sections (223) each having a size substantially consistent with a preferred size. Each of the file sections is categorised (224) and the sets of associations are processed (225) to produce a set of category associations for the original undivided file (221).

36 Claims, 23 Drawing Sheets

| PREFERRED TERM | POINTER |
|---|---|
| OIL_INDUSTRY | OF8912 |
| OIL_INSTITUTIONS | 192AC3 |
| OIL_ | 516321 |
| PETROLEUM_ | 3200FI |
| ⋮ | ⋮ |
| | |
| | |
| | |

1801 — PREFERRED TERM
1802 — POINTER

Figure 18

| ADDRESS | FILE NAME | POINTER |
|---|---|---|
| OF8912 | Oil_industry_netherland_3 | OF8A20 |
| OF8A20 | Oil_ind_india_flash_ | OF8193 |
| OFA193 | Petrochem_times.3.9.97 | 100AB1 |
| 100AB1 | [END] | 000000 |
| ⋮ | | |
| 192AC3 | BP.index_ft_uk_97 | 20A21B |
| ⋮ | | |

1901 — ADDRESS
1902 — FILE NAME
1903 — POINTER

*Figure 23* home

Your search is being performed on News and will display the first 7 titles sorted by publication date.
Your are searching for documents within the market sector cinema *and* theatre containing the free text stage.

| GET | ⦿ Selected | ○ Context | ○ Price | Save Search |
| | | | | Create Alert |

2401

News
Displaying titles 1 to 7 of at least 933 records

1. ☐☑ <u>Monty's Bafta glory leaves Rowan without a bean</u> - INDEPENDENT - March 10th, 1998 (45 lines)
2. ☐☑ <u>Tuesday'sticket</u> - INDEPENDENT - March 10th, 1998 (12 lines)
3. ☐☑ <u>Barrel of laughs</u> - NEW STRAITS TIMES - March 10th, 1998 (45 lines)
4. ☐☑ <u>All the president's mien:Arts:Film</u> - THE TIMES - March 9th, 1998 (108 lines)
5. ☐☑ <u>ACTRESS OF MANY PARTS IS DIY STAR</u> - EVENING STANDARD - March 9th, 1998 (19 lines)
6. ☐☑<u>People</u> - UNITED PRESS INTERNATIONAL - March 9th, 1998 (56 lines)
7. ☐☑<u>The Arts: Clever ringmaster up to his tricks</u> Theatre - SUNDAY TELEGRAPH - March 8th, 1998 (84 lines)

<u>Next 7</u>

2402 home • Dossier • Portfolio • Alert Manager • Utilities • Client Resources • Help?

ASSOCIATING FILES OF DATA

FIELD OF THE INVENTION

The present invention relates to associating large data files to information categories.

INTRODUCTION TO THE INVENTION

Traditionally, database technology has been dedicated to the organisation of numerical and tabular data and it is only recently, particularly with the expansion of the Internet, that demand has grown significantly for the retrieval of text-based files. Several facilities are available on the Internet, commonly referred to as "search engines" which assist in the location of information. The majority of these operate by performing what has become known as "free text" searching, in which a user specifies words which they believe are contained within the target file as a mechanism for instructing the system to retrieve files of interest.

Problems with this technique are well known to users of the available search engines, and a simple enquiry can generate hundreds of thousands of "hits", the majority of which will tend to be totally irrelevant to the user's needs. Furthermore, other relevant files may be missed simply because they do not contain the specific chosen words.

As is well documented, a problem with the Internet is that the freedom of the Internet is also its downfall. Information is not classified before it is made available, therefore it is highly likely that even the simplest search will fail to identify relevant documentation and will take a considerable period of time to perform.

Procedures for classifying volumes of data so as to facilitate subsequent searching are known but these classification processes often involve manual intervention, thereby making them time consuming and prone to human error. Furthermore, except in circumstances where the documentation is considered to be extremely valuable and will continue to be required over a significant period of time, the cost of performing this manual exercise cannot be justified in terms of the commercial worth of the data sources being considered. Consequently, the problem results in much data being effectively inaccessible and outside the realm of searchable knowledge.

Procedures are known for processing a data file so as to determine whether the data file should be associated with a particular information category. The known processes require a machine readable association file (or outline file) and using this, it is possible for the incoming data file to be processed to produce a numerical score value defining the extent to which the data file is relevant to the associated category. Thereafter, decisions may be made as to whether the data file is to be associated with particular categories by performing respective threshold comparisons.

In practical systems, thousands of such outline files would be required in order to provide a useful level of categorisation. In the present applicant's co-pending British patent application number 98 08 808.1, in the present applicant's co-pending European patent application (DGC-P11-EP) and in the present Assignee's co-pending United States patent application (DGC-P11-US) a method of generating machine readable association files is described. A plurality of data files are manually selected as being examples of files which should be associated with a particular category. In addition, a plurality of files are selected manually which are considered not to be associated with a particular category. Having identified these files, the process identifies preferred term candidates from the associated files, weights these candidates with reference to files not associated with the category and applies terms to a machine readable association file by analysing the weighting values.

The resulting association files are particularly well suited to associating new data files which are of substantially similar size to the original source data files. Similarly, association files generated by more traditional techniques still tend to be well suited to input data files of a particular size but less well suited to incoming data files of differing sizes. Thus, if a new incoming data file is larger than the optimum file size, it is possible that many irrelevant files will be inappropriately categorised given that the processing of these files will result in an inappropriately high weighting value being calculated.

SUMMARY OF THE INVENTION

According to a first aspect of the present invention, there is provided apparatus configured to associate files of data of a size greater than a predetermined size, comprising dividing means configured to divide a file into a plurality of file sections having a size substantially consistent with a preferred size; categorising means configured to categorise each of said file sections to produce sets of section associations; and processing means configured to process said sets of section associations to produce a set of category associations for the original undivided file.

In a preferred embodiment, the categorising means is configured to categorise each file section by processing a section in combination with association files. Preferably, the apparatus includes storage means for storing the association files as outline files and each of the stored outline files may relate to a respective category.

According to a second aspect of the present invention, there is provided a method of associating files of data of a size greater than a predetermined size, comprising steps of dividing a file into a plurality of file sections each having a size substantially consistent with a preferred size; categorising each of said file sections to produce sets of section associations; and processing said sets of section associations to produce a set of category associations for the original undivided file.

Preferably, the preferred size is smaller than the predetermined size.

In a preferred embodiment, tables are removed from a data file before a file is divided into sections. Preferably, an assessment is made as to whether it is desirable to increase size sections, whereafter the size of said sections are increased and the dividing process is repeated. Preferably, data files are continually received from data sources.

BRIEF DESCRIPTION OF THE DRAWINGS

FIG. 18 details a table of preferred terms;

FIG. 19 details a linked list of preferred terms;

FIG. 21 details a screen display prompting a user to identify a search method;

FIG. 23 details a screen display for displaying titles of associated files.

DETAILED DESCRIPTION OF THE PREFERRED EMBODIMENTS

Figure 1:
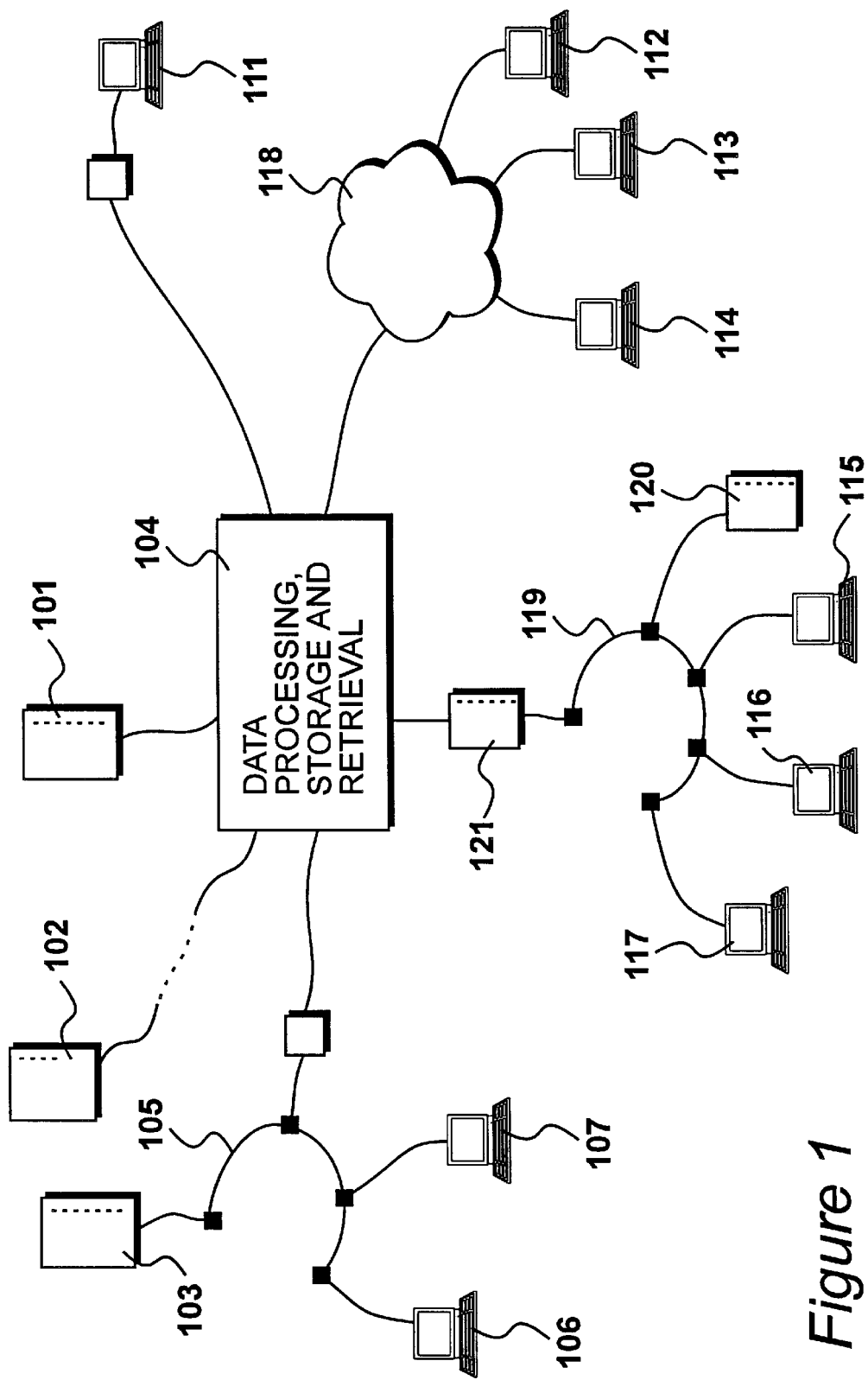
FIG. 1 shows a data distribution environment, including a data processing, storage and retrieval system.

A data distribution environment is illustrated in FIG. 1 in which data, received from a plurality of data sources 101, 102, 103 is supplied to a data processing, storage and retrieval system 104. Data sources 101 and 102 supply data directly to processing system 104 while data source 103 supplies data via a local area network 105, thereby allowing user terminals 106 and 107 to gain direct access to their local data source 103.

The processing system 104 provides access to a plurality of users, such as users 111, 112, 113, 114, 115, 116 and 117. User 111 has direct access to the processing system 104 while users 112, 113 and 114 gain access to the processing system 104 via the Internet 118. Users 115, 116 and 117 exist within a more sophisticated environment in which they have access, via a local area network 119 to their own local database system 120 in addition to a connection, via an interface 121, to the data processing system 104.

All incoming data from data sources 101 to 103 is categorised with a key word in seven separate fields, comprising "market sector", "location", "company name", "publisher", "publication date" and "scope". Users, such as users 112 to 117 may specify almost any term as the basis for a search and are then prompted by an equivalent word or phrase which constitutes more preferred search parameters. For example, a user may specify a search word such as "confectionery" and the system will prompt the user to consider narrower terms such as "chocolate" along with related terms such as "cakes" or "desserts", or broader terms such as "food". From a simple request, a user is given an option of focusing further or of taking a broader overview of the subject under consideration.

The scope of an article refers to the context in which the document or article was written. For example, the scope field may consider questions as to whether the article concerns "mergers and acquisitions" or "seasonal trends" et cetera. Such terms are useful in gathering related information from a wide variety of industries and markets and may prove invaluable for particular applications.

Figure 2A:
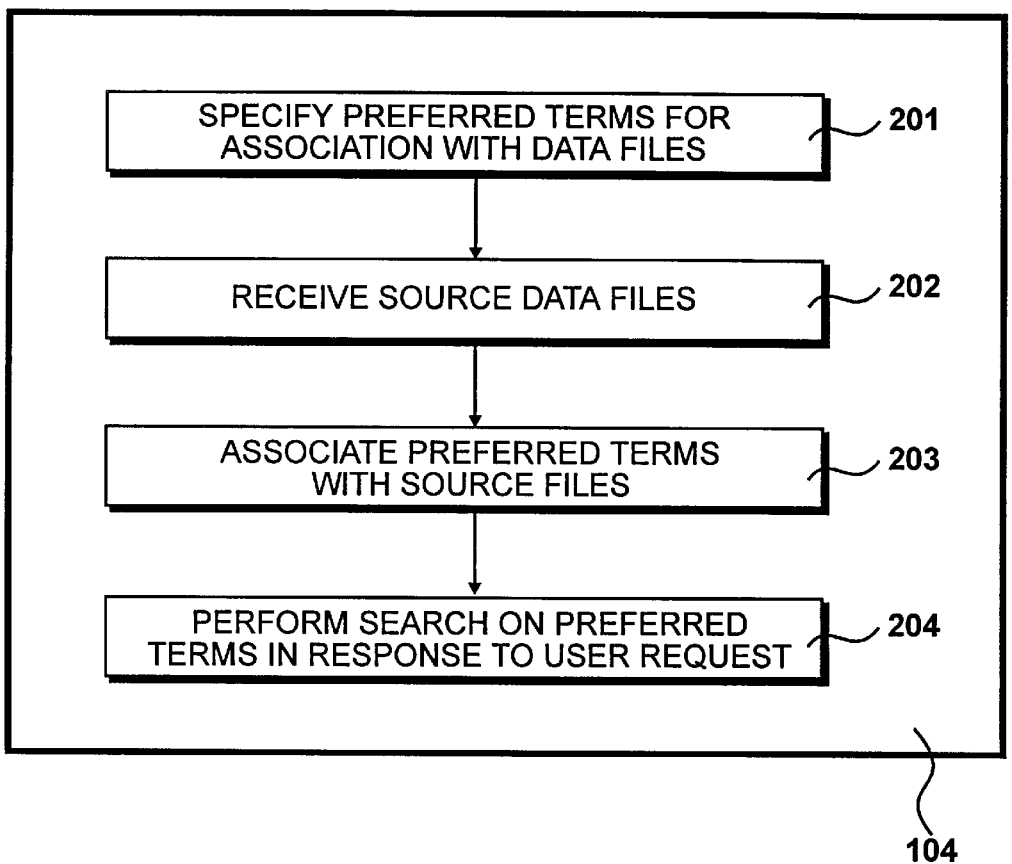
FIG. 2A illustrates procedures performed by the processing system shown in FIG. 1, including a process for specifying preferred terms, a process for associating preferred terms with source files and a process for performing a search in response to a user request.

The same criteria used for indexing are offered for search purposes and the same indexing terms are used for all documents across a range of specific databases. An overview of procedures performed by the data processing system 104 is illustrated in FIG. 2. At step 201 preferred terms for association with data files are specified. This step is essentially performed as an "off-line" process; establishing the environment for allowing source data to be processed as it is received from sources.

Steps 202, 203 and 204 represent on-line procedures after the preferred terms have been specified at step 201. At step 202 the processing system 104 receives data from sources such as sources 101, 102 and 103.

The source data may be transmitted using different protocols, formats and standards therefore the processing system performs a standardisation process so that the data may be stored locally at the data processing system using standardised formats.

At step 203 the data is processed so as to enhance a user's ability to identify information of interest. Files of machine-readable data received from the sources are associated with specific preferred terms which may be considered as defining particular information types. A file is considered and individual data elements, usually in the form of natural language words, are examined to identify occurrences of specified data types. The purpose of this association is to identify files of data which are of interest in relation to particular topics. This enables a user to organise a search which should result in useful information being supplied to said user, with reference to said topics and defined terms, from an extremely large database of stored data files. In this way, the technical procedures performed by association step 203 significantly enhances the overall functionality of the system and provides an industrially applicable approach to allowing highly focused sets of information to be supplied to a user in preference to large volumes of data; much of which will tend to be totally irrelevant.

In order to achieve this, the files of data are processed and are given a score representing a numerical value as to their relevance with respect to the predefined topics. Scores are adjusted in response to the number of identified occurrences of a specified data type. Furthermore, these scores are also adjusted in relation to the size of the data contained within the file. In particular, occurrences of data types in relatively small files are given a higher weighting with occurrences in larger files being given a lower weighting. Thus, the adjustment of scores is related inversely to the actual size of the data file. Thereafter, a threshold for the scoring values may be set and information types are associated with particular files dependent upon whether particular value scores fall on one side or on the other side of this threshold.

At step 204 a search is performed, in response to preferred terms identified by a user such that information of interest may be identified within the data stored by the data processing system 104 and transmitted to user terminals, such as terminal 111, over transmission channels as illustrated in FIG. 1.

Figure 2B:
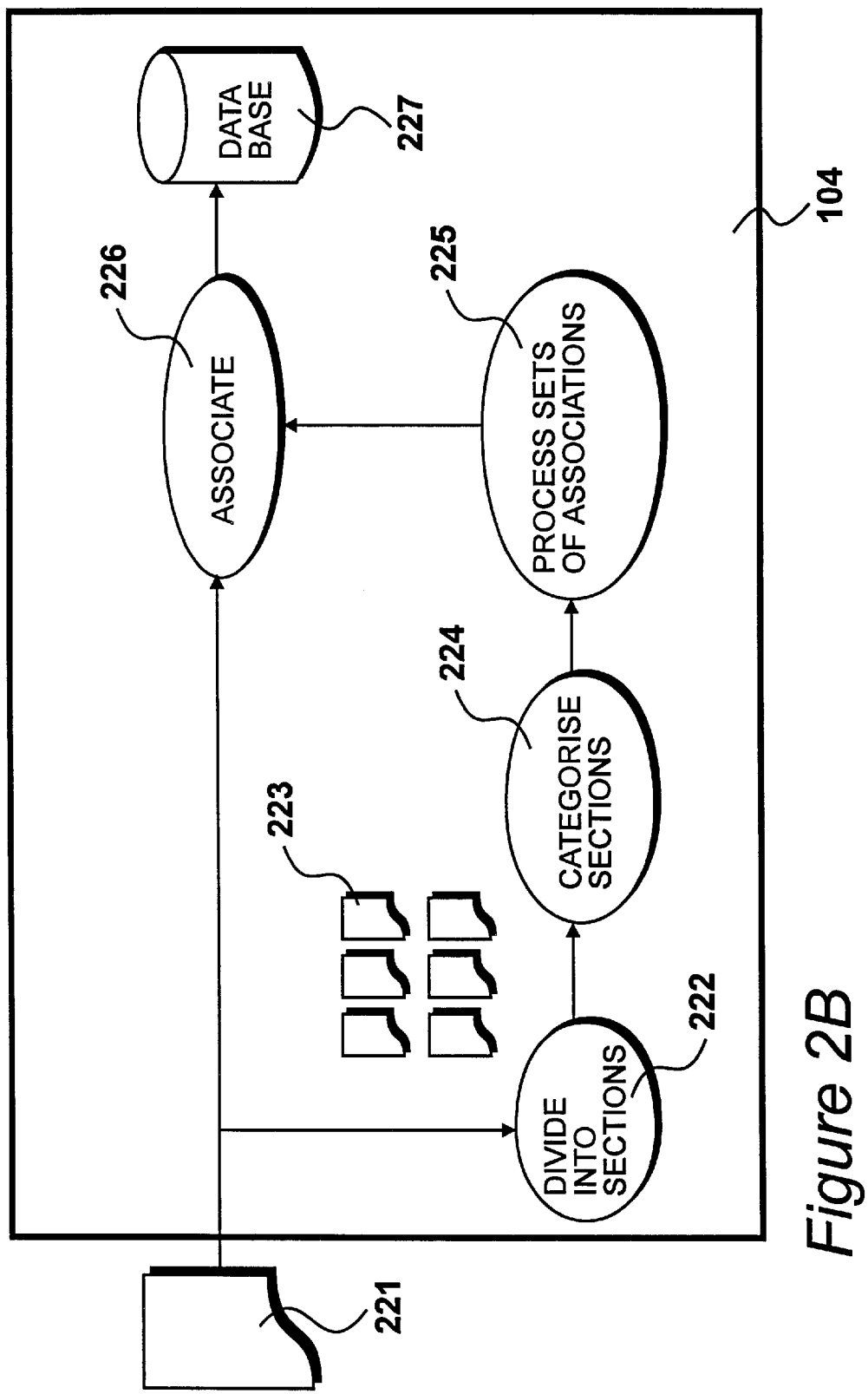
FIG. 2B shows an overview of the operations performed by the environment shown in FIG. 1.

An overview of the operations performed by the environment shown in FIG. 1, in accordance with the present invention, is shown in FIG. 2B. Processing system 104 receives input files, such as input file 221. It has been determined that incoming file 221 has a size which is greater than a predetermined size and in this example the predetermined size is set at fifty thousand characters. A process 222 divides the incoming file into a plurality of file sections each having a size substantially consistent with a preferred size. In this example, the preferred size is established at ten thousand characters. Furthermore, a file section is considered to have a size consistent with this preferred size if it has an actual size of between ten and twenty thousand characters.

File sections derived from file 221, in response to the operation of process 222, are illustrated generally at 223. Six file sections are shown but the actual number of file sections produced will depend upon the size of the original file.

File sections 223 are each individually categorised by process 224 and it is assumed that a process is available for performing this categorisation upon files having sections consistent with the preferred size.

Figure 3:
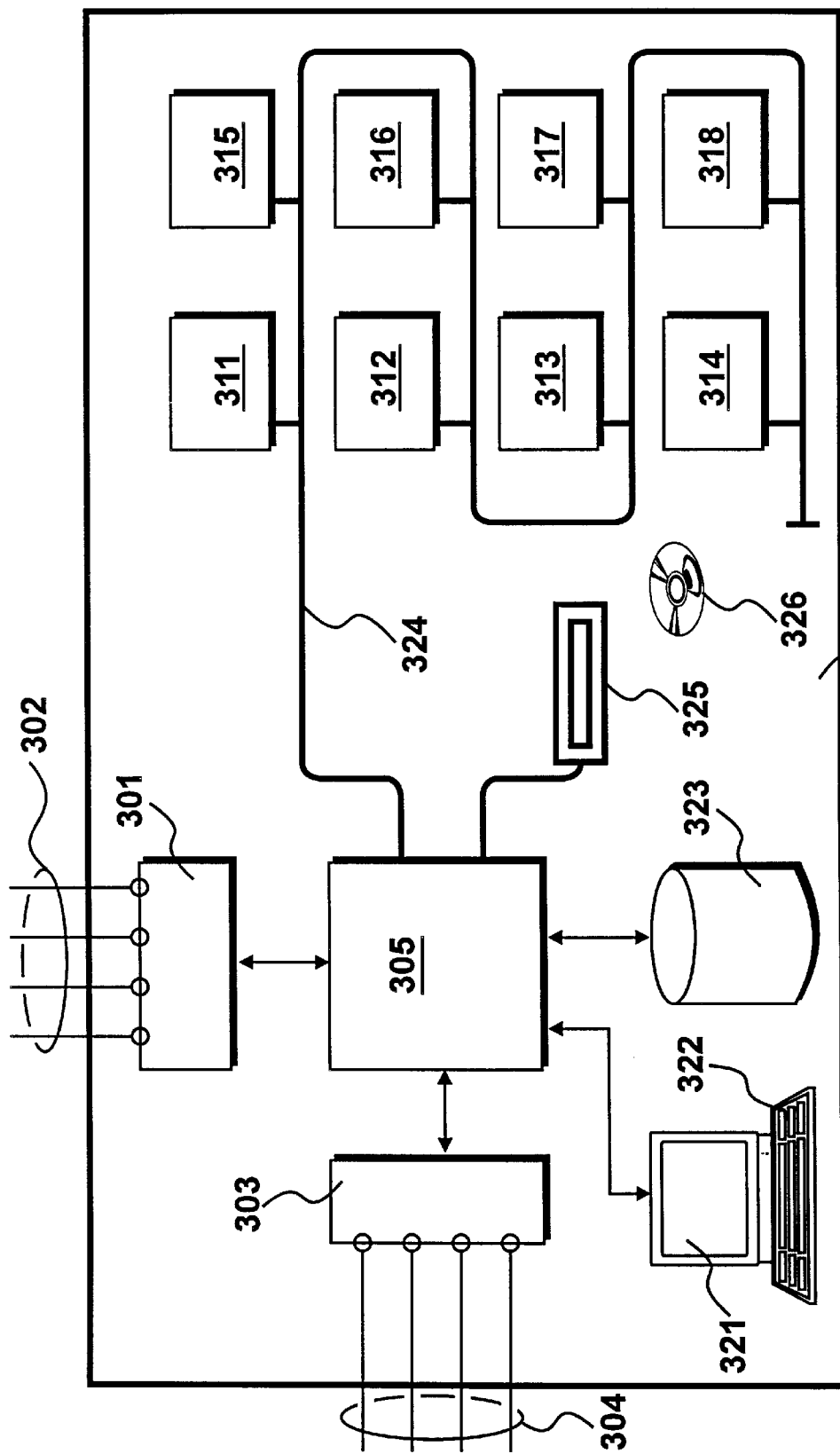
FIG. 3 details a processing system identified in FIG. 1.

Process 224 produces a set of associations for each section and the sets of section associations are processed by process 225 to produce a single set of category associations for the original undivided file 221. An association process 226 then associates the original file 221 with the set of associations produced by process 225 so that the file data and its association data may be written to a database 227. Processing system 104 is detailed in FIG. 3. Data signals from data sources 101 to 103 are supplied to input interfaces 301 via data input lines 302. Similarly, output data signals are supplied to users 111 to 117 via an output interface 303 and output wires 304. Input interface 301 and output interface 303 communicate with a central processing system 305 based on DEC Alpha integrated circuitry. The central processing system 305 also communicates with other processing systems in a distributed processing architecture. Processing system 104 includes eight Intel chip based processing systems 311 to 318, each implementing instructions under the control of a conventional operating system such as Windows NT.

An operator communicates with the processing system 104 by means of an operator terminal, having a visual display unit 321 and a manually operable keyboard 322. Data files received from sources 101 to 103 are written to bulk storage devices 323 in the form of large magnetic disk arrays. Data files are written to disk arrays 323 after these files have been associated with preferred terms, as illustrated at step 203. These association processes are performed by the subsidiary processors 311 to 318 and the central processing system 305 is mainly concerned with the switching and transferring of data between the interface circuits 301, 303 and the disk arrays 323.

The central processing system 305 communicates with the subsidiary processors 311 to 318 via an Ethernet connection 324 and processing requirements are distributed between processors 311 to 318. Having addressed a subsidiary processor 311 to 318 the transferring of data to an addressed processor is performed. Each individual incoming data file is supplied exclusively to one of the subsidiary processors. The selected subsidiary processor is then responsible for performing the association process, to identify preferred terms relevant to that particular data file. Thereafter, the associated data file is returned to the central processing system 305, over connection 324 and the central processing system 305 is then responsible for writing the associated data file to the disk array 323. In this way, it is possible to scale the degree of processing capacity provided by system 104 in dependence upon the volume of data files to be processed in this way. The central processing system 305 also maintains a table of preferred terms, pointing to particular data files which have been identified as relevant to said preferred terms. The facility includes a CD ROM reader 325, arranged to read CD ROM's such as ROM 326. In this way it is possible to install executable instructions for computer system 305 and for computer systems 311 to 318.

Figure 4:
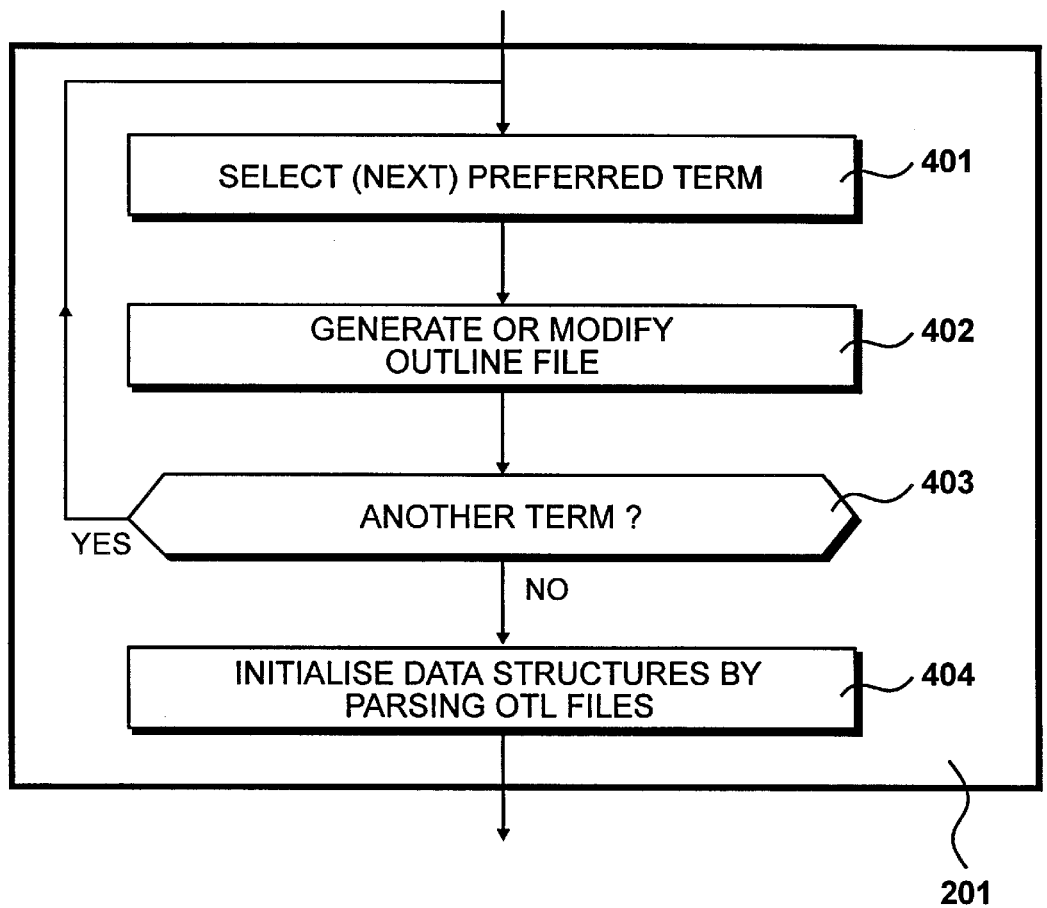
FIG. 4 details a process for specifying preferred terms for association with data files identified in FIG. 2.

Process 201 for specifying preferred terms for association with data files is detailed in FIG. 4. At step 401 a preferred term is selected and at step 402 an outline (OTL) file is generated or modified. At step 403 a question is asked as to whether another term is to be processed and when answered in the affirmative control is returned to step 401, allowing the next term to be processed at step 402. Eventually, all of the terms will have been processed resulting in appropriate generations or modifications to their related outline files. Consequently, the question asked at step 403 is answered in the negative whereafter at step 404 data structures are initialised by parsing the OTL files generated at step 402.

Figure 5:
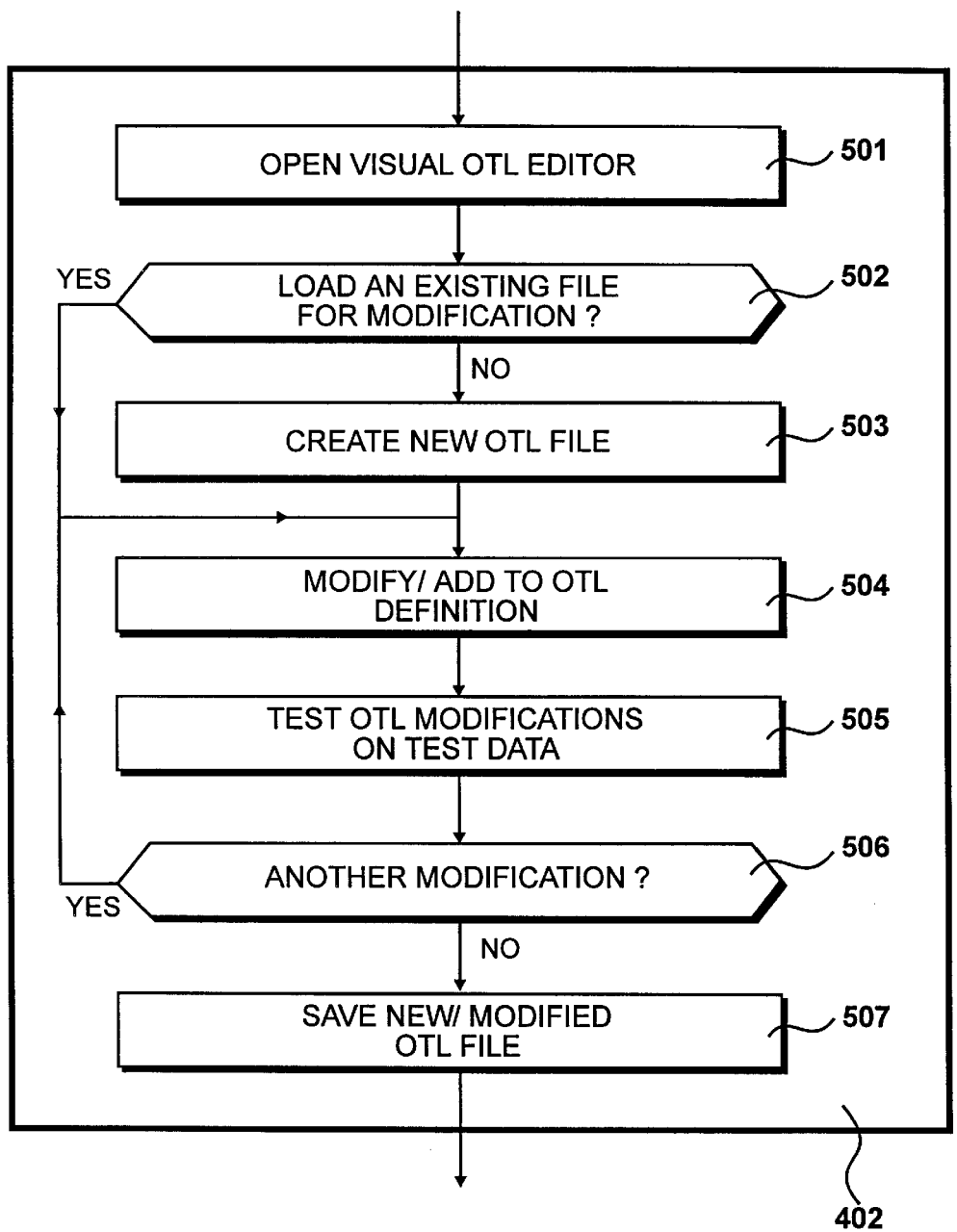
FIG. 5 details a process for the generation or modification of outline files identified in FIG. 4.

Step 402 for the generation or modification of outline files is detailed in FIG. 5. At step 501 a visual OTL editor is opened resulting in the editor's visual interface being displayed on VDU 321. At step 502 a question is asked as to whether an existing file is to be loaded for modification and if answered in the negative a new OTL file is created at step 503. If the question asked at step 502 is answered in the affirmative, step 503 is bypassed and at step 504 modifications or additions are made to the OTL definition. At step 505 the OTL modifications created at step 504 are tested on a sample of test data and at step 506 a question is asked as to whether another modification is to be made. When answered in the affirmative, control is returned to step 504 resulting in further modifications or additions being made to the OTL definitions. When answered in the negative at step 506, the new or modified OTL file is saved at step 507.

When performing modifications or additions at step 504, a graphical representation of the OTL file data is presented to an operator via the visual display unit 321. An example of a display of this type is illustrated in FIG. 6, representing a graphical illustration of a specific OTL file.

Figure 6:
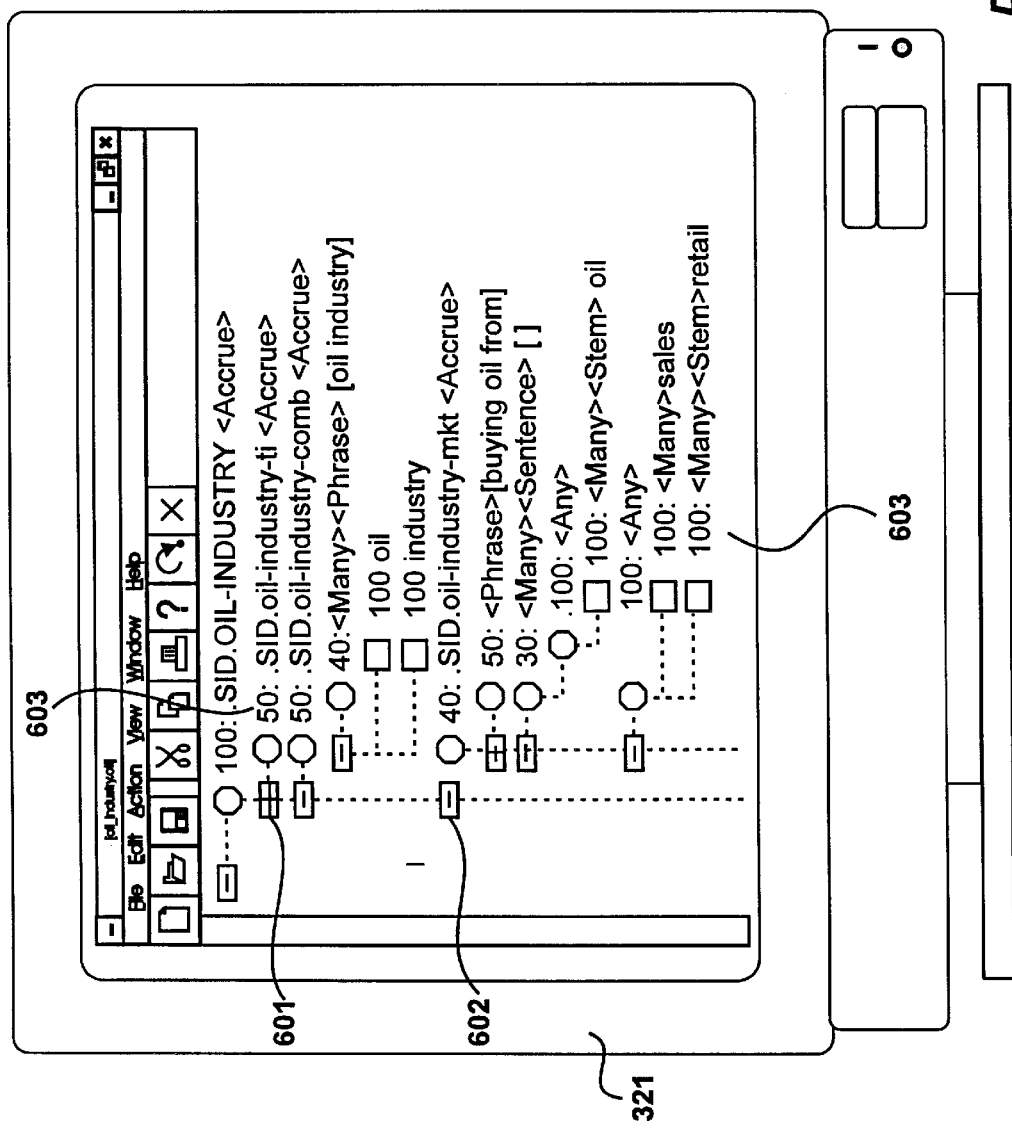
FIG. 6 illustrates a graphical view of an OTL file structure.

The OTL file stores definitions in an hierarchical tree structure and this structure is represented in the graphical view as shown in FIG. 6. A representation of the tree may be contracted or expanded and the possibility of expanding a particular branch is identified by a plus sign on a particular line, as shown at 601. Similarly, when a particular branch has been fully expanded, the line is identified by a minus sign as shown at 602. Definitions within the file consist of rules, words and labels. The labels allow relationships to be defined between various parts of the file and between individual files themselves. The words identify specific words within an input file of interest and the rules define how and what weights are to be attributed to these words. Each rule line includes, at its beginning, a weight value 603 representing the score that will be attributed when a particular rule condition is met. Rules may also have leaves and the rule defines the way in which scores generated from leaves are combined.

Figure 7:
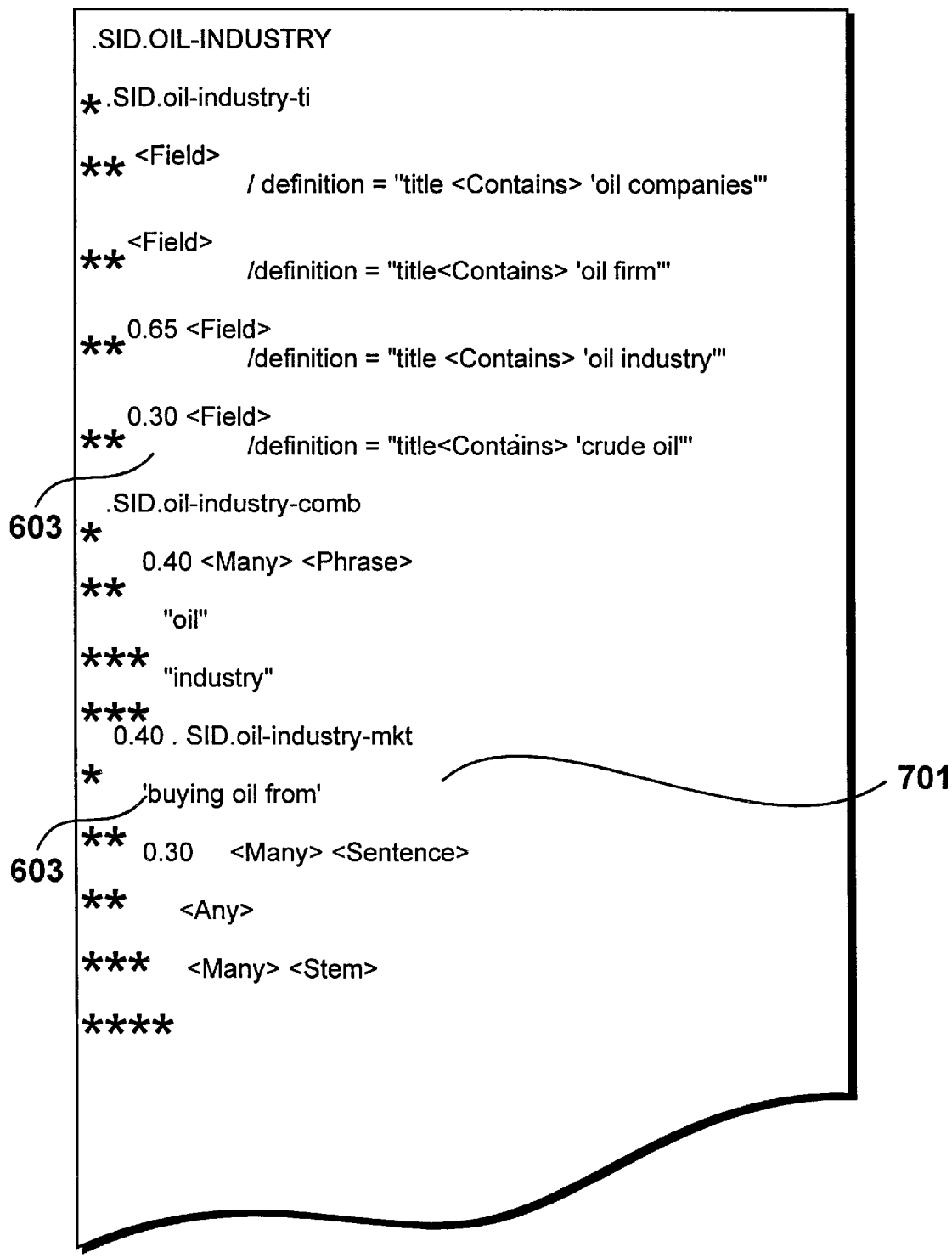
FIG. 7 illustrates a data file for the information represented graphically in FIG. 6.

OTL file data, represented graphically in the form shown in FIG. 6, is actually stored in a data file having a format of the type shown in FIG. 7. The actual data file shown in FIG. 7 corresponds to the data display in FIG. 6 but in FIG. 7 all of the data, some of which has been rolled up in FIG. 6, is present. The data contained within the file shown in FIG. 7 is manipulated interactively by an operator in response to the graphical interface displayed as illustrated in FIG. 6. Score values 603 are also identified in the data file shown in FIG. 7.

Displayed line 601 in FIG. 6 is generated from line 701 of the actual stored data. The syntax of the language used for recording the data, as illustrated in FIG. 7, may vary and the example shown is specific to this particular application. However, the underlying functionality of the language may be considered with reference to the diagrammatic representation shown in FIG. 8.

Figure 8:
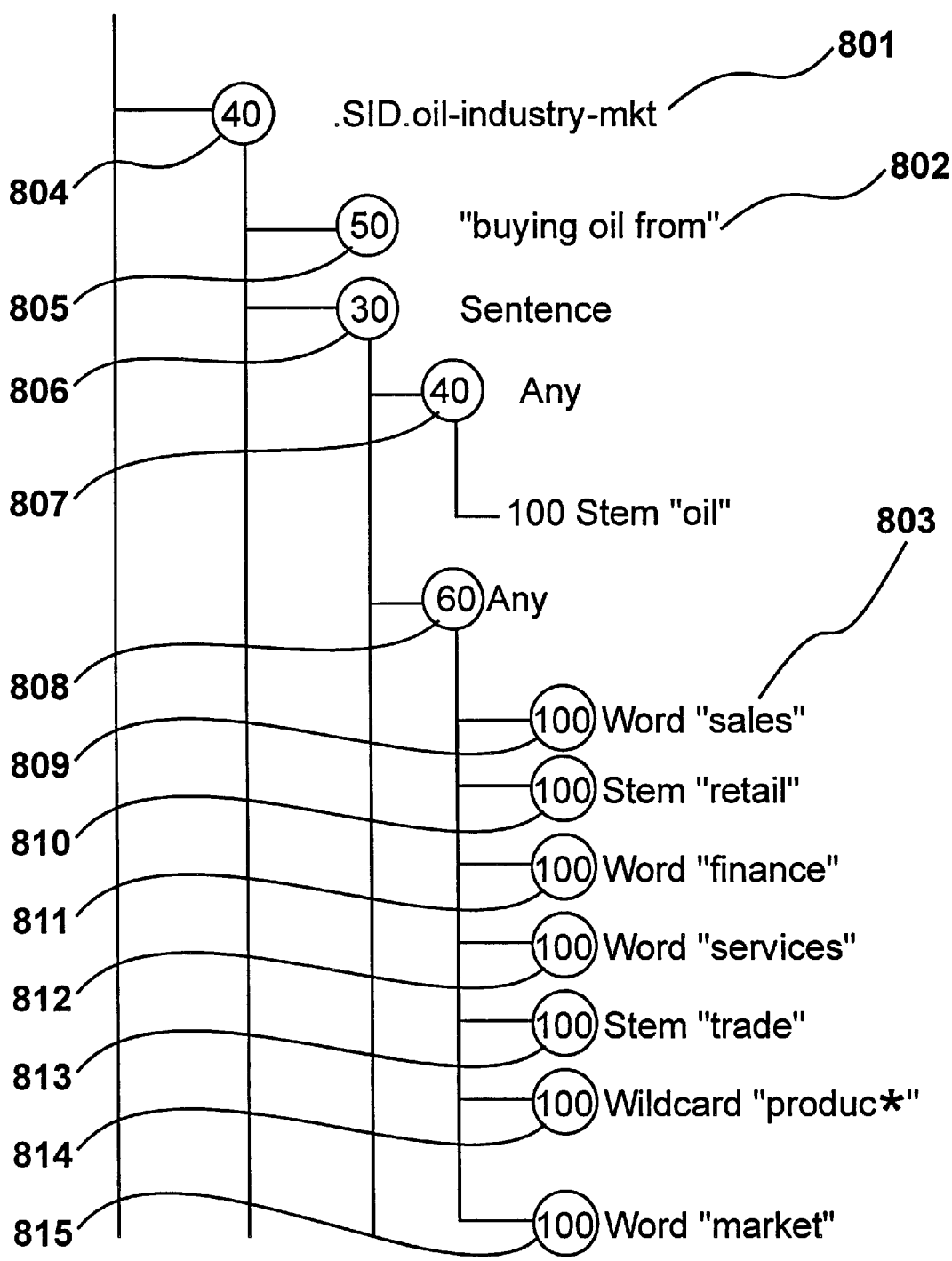
FIG. 8 shows a diagrammatic representation of the data file shown in FIG. 7.

The outlines analyse data files in order to produce numerical evidence as to the relevance of a particular file with relation to a particular topic. The OTL definitions and structures are determined empirically and would be modified and upgraded over a period of time. The system does more than merely register the existence of a particular word item by placing the word items within an interacting structure; the nature of which is illustrated in FIG. 8. The particular entry, given label "oil-industry-mkt" relates to marketing aspects of the oil industry and as such can contribute to an overall score as to the pertinence of incoming data to this particular topic. The first line 801 shows that this particular contribution may provide a total score of forty percent. This total of forty percent is then subdivided such that at line 802 the presence of the phase "buying oil from" has a score of fifty percent. Thus, the total contribution made by the presence of this phrase consists of fifty percent of forty percent, i.e. a total of twenty percent being made to the total contribution. Similarly, as shown at line 803 and below, particular words may be identified which result in contributions of sixty percent of thirty percent of forty percent. Thus, a complete OTL file is structured in this way with particular words and phrases making contributions to an overall score value. These words and phrases may also be specified in the rules as making single contributions or being allowed to accrue.

Examples of score value 603 are illustrated in FIG. 8 at 804 to 815. The hierarchical structure in FIG. 8 consists of a plurality of branches with lowest level entries being considered as leaves. Each leaf has a score value associated with it and values 809 to 815 are leaf score values. Above these, branch score values exist such that score values 807 and 808 exist at the lowest level of branching with score values 805 and 806 being at the next level of branching further up each connected to the highest level of branching illustrated by score value 804.

A total score value for a particular occurrence, detected at any level within the hierarchical tree, results in a final score contribution derived from the product of the score value assigned to that particular level with all score levels identified while ascending the tree structure back to its root.

The score contributions are produced and possibly accumulated when occurrences of the specified elements are identified. This provides a numerical weight to assess whether a file being processed should be associated with a particular information type. The present invention, as implemented within the preferred embodiment, further adjusts these score weight in relation to the size of the overall data file. In particular, it is the branch score values (804 to 808) which are modified in preference to leaf values (809 to 815).

Figure 9:
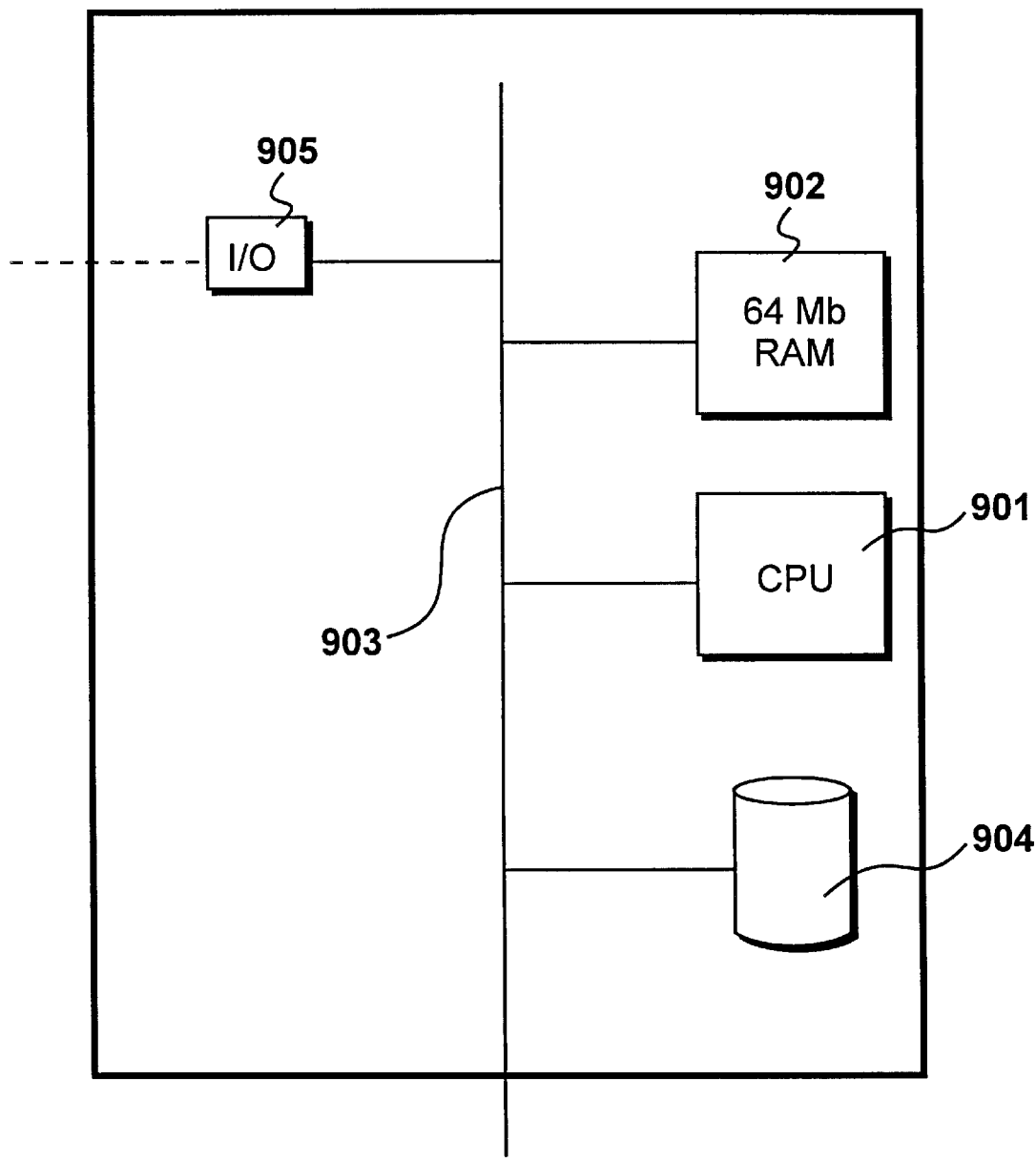
FIG. 9 details a subsidiary processor of the type identified in FIG. 3.

Subsidiary processor 311 is detailed in FIG. 9. The processor includes an Intel Pentium processing unit 901 connected to sixty-four megabytes of randomly accessible memory 902 via a PCI bus 903. In addition, a local disk drive 304 and interface circuit 905 is connected to bus 903. Interface circuit 905 communicates with the TCP/IP network 324.

Figure 10:
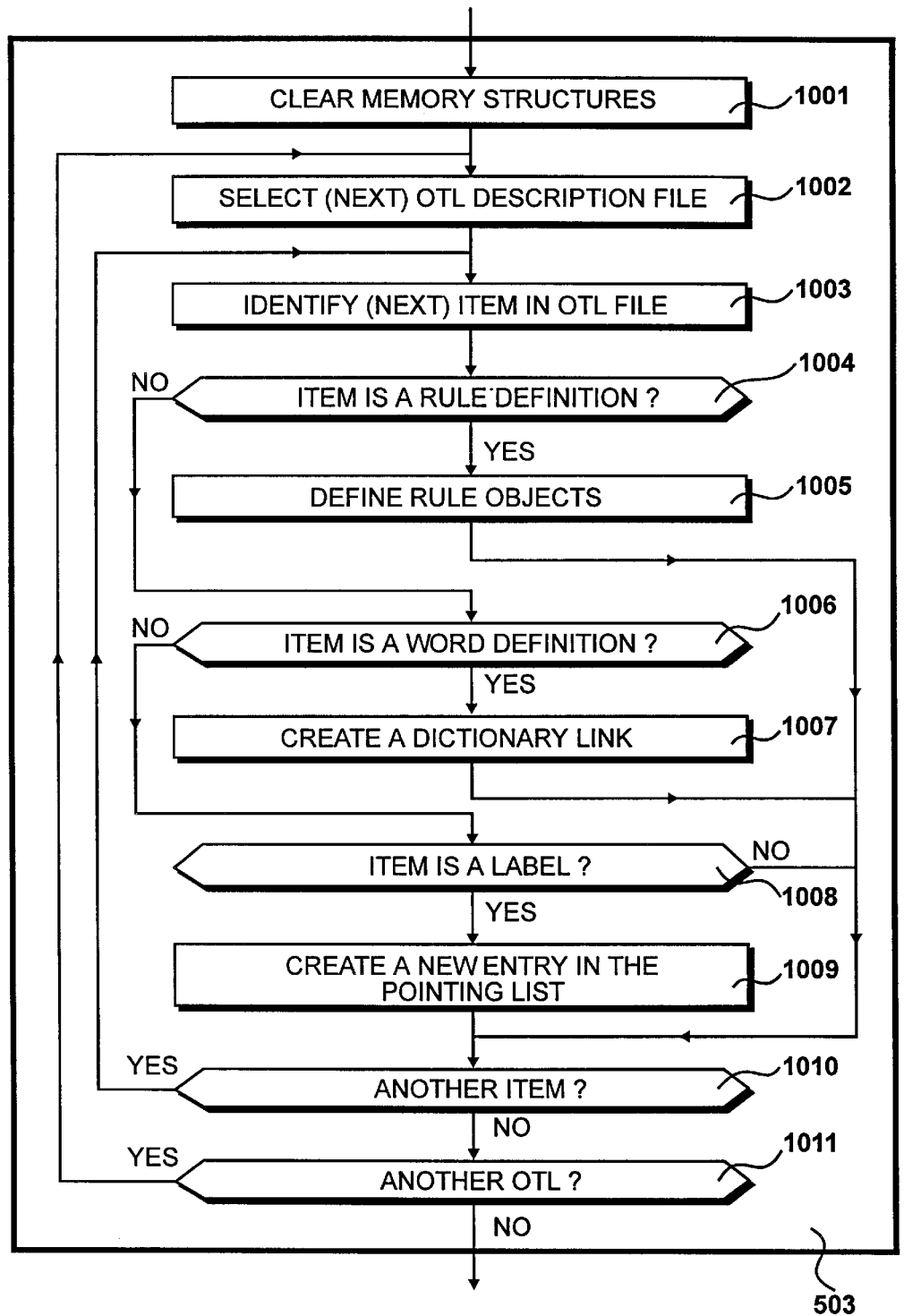
FIG. 10 details procedures for the creation of a new OTL file identified in FIG. 5.

Random access memory 902 stores instructions executable by the processing unit 901, in addition to storing input data files received from the data sources 101 to 103 and intermediate data. Procedures 503 for the creation of a new OTL file are detailed in FIG. 10.

At step 1001 temporary memory structures are cleared and at step 1002 an OTL description file is selected. At step 1003 an item in the OTL file is identified and at step 1004 a question is asked as to whether the item selected at step 1003 is a rule definition. If this question is answered in the affirmative, a rule object is defined at step 1005. Alternatively, if the question asked at step 1004 is answered in the negative, to the effect that the item is not a rule definition, a question is asked at step 1006 as to whether the item is a word definition. If this question is answered in the affirmative, a dictionary link is created at step 1004.

At step 1008 a question is asked as to whether the item is a label and when answered in the affirmative a new entry is created in a label list, whereafter at step 1010 a question is asked as to whether another item is present. After executing step 1005 or after executing step 1007, control is directed to step 1010.

When a question asked at step 1010 is answered in the affirmative, to the effect that another item is present, control is returned to step 1003 and the next item is identified in the OTL file. Eventually, all of the items will have been identified resulting in the question asked at step 1010 being answered in the negative. Thereafter, at step 1011 a question is asked as to whether another OTL file is present and when answered in the affirmative control is returned to step 1002 allowing the next OTL description file to be selected. Thus, this process continues until all of the OTL files have been considered resulting in the question asked at step 1011 being answered in the negative.

Figure 11:
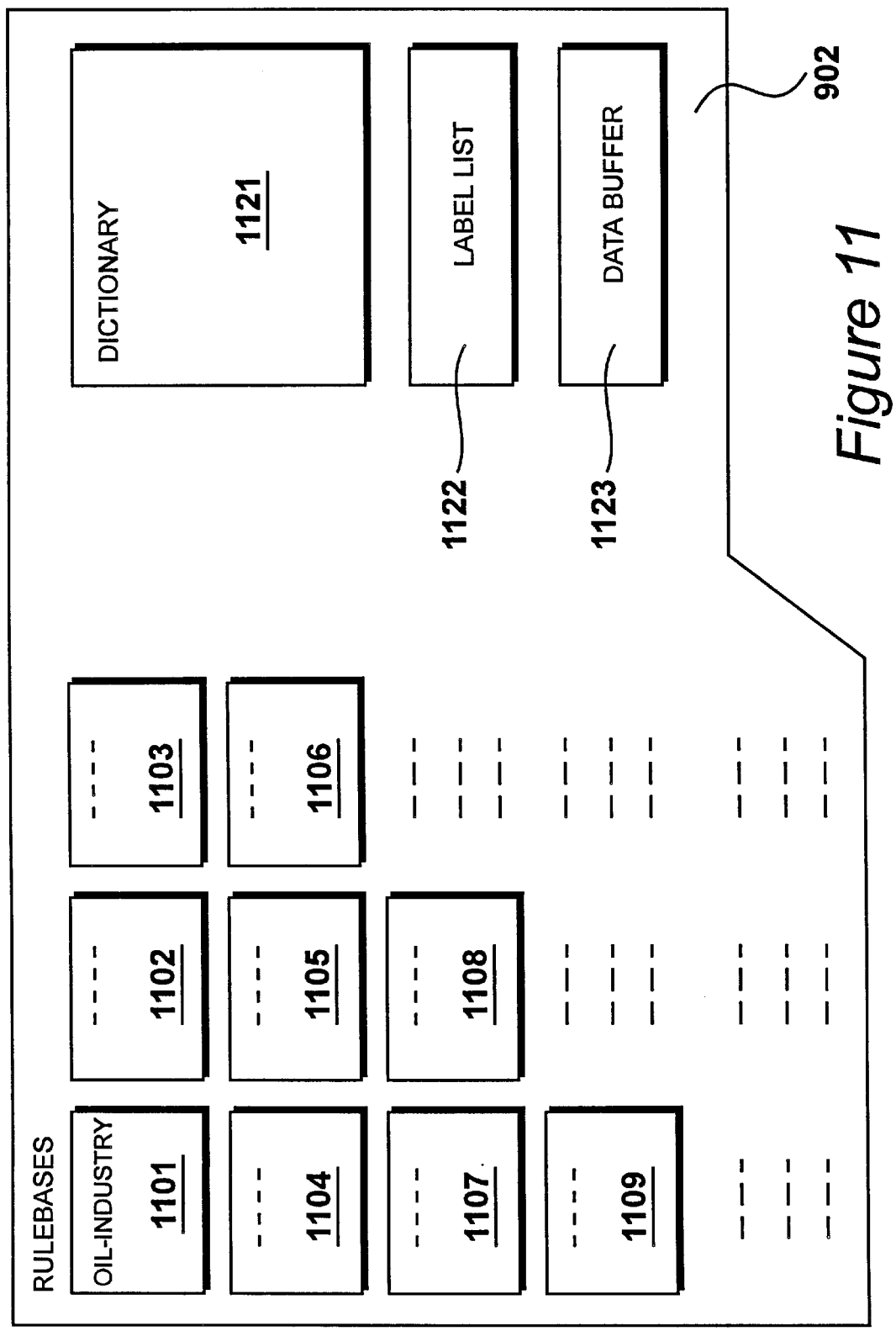
FIG. 11 illustrates a plurality of rulebases produced by the execution of procedures identified in FIG. 10.

For each OTL file considered, by being selected at step 1002, a rulebase is generated and a plurality of such rulebases is illustrated in FIG. 11. Thus, a first OTL file processed in accordance with the procedures shown in FIG. 10 results in the generation of a first rulebase 1101. Similarly, further iterations of the procedures shown in FIG. 7 result in the generation of rulebases 1102 to 1109. Typically, for a specific installation, in the order of three thousand rulebases would be generated by execution of the procedures illustrated in FIG. 10.

Rulebases 1101 to 1109 are stored in memory 902, which also provides storage space for a dictionary 1121, a label list 1122 and a data buffer 1123. The dictionary stores a list of words which have importance in any of the stored rulebases. Associated with each word in the dictionary, there is at least one pointer and possibly many pointers, to specific entries in specific rulebases 1101 to 1109. Thus, the words identified at 803 in FIG. 8 would all be included in dictionary 1121. Entries within the dictionary 1121 are implemented upon execution of step 1007 in FIG. 10. Similarly, execution of step 1009, creating a new entry in the label list, allows a label to relate to rules that are elsewhere in the tree structure.

Figure 12:
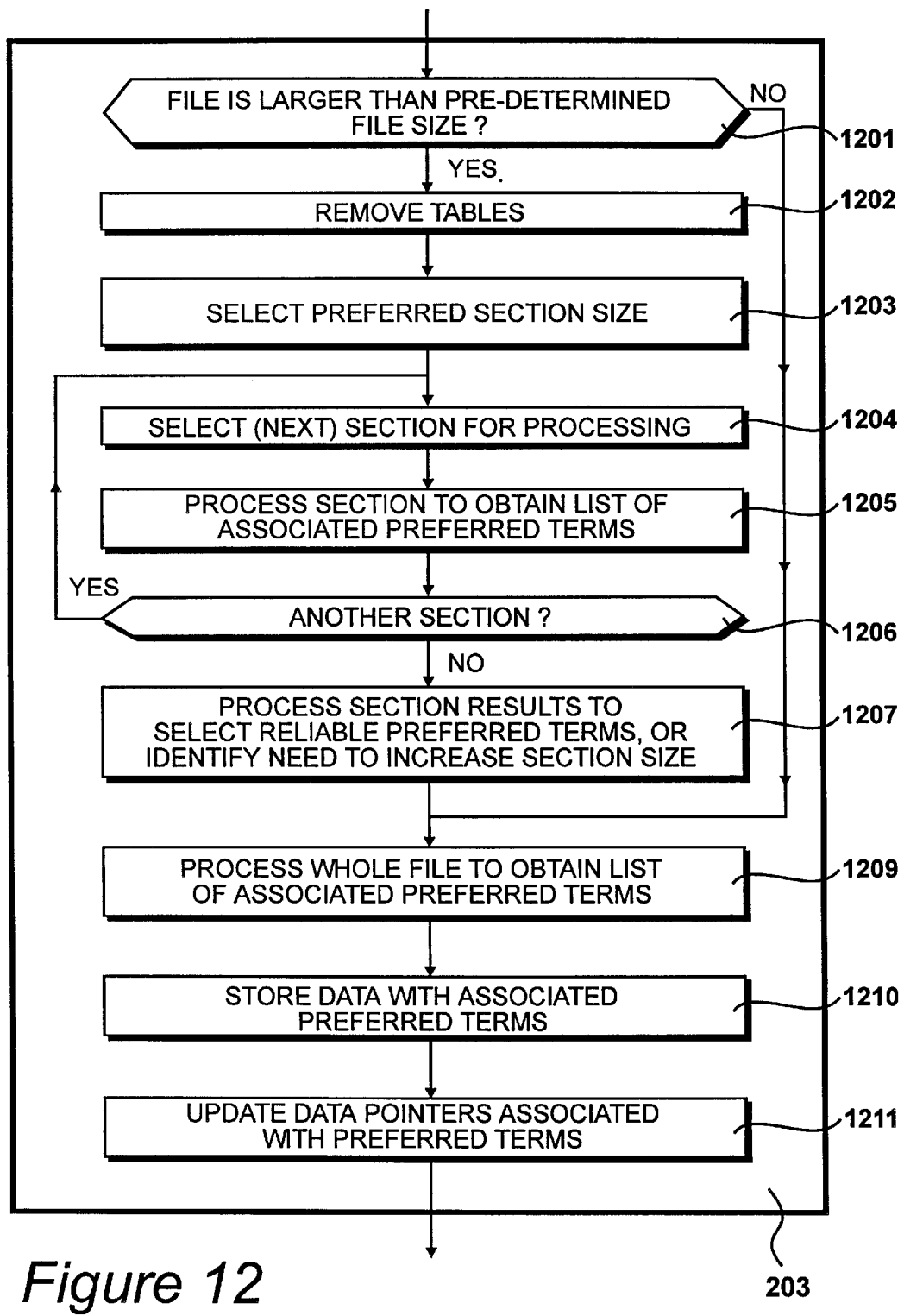
FIG. 12 details a process for the association of preferred terms identified in FIG. 2.

Process 203 for the association of preferred terms with source files is detailed in FIG. 12. At step 1201 a question is asked as to whether the file is larger than a predetermined file size and if answered in the negative, control is directed to step 1209 where the whole file is processed to obtain a list of associated preferred terms.

If the question asked at step 1201 is answered in the affirmative, to the effect that the file is larger than a predetermined size, any tables present within the file are removed at step 1202.

At step 1203, a preferred section size is selected and at step 1204 a file section is selected for processing and at step 1205 the section is processed so as to obtain a list of associated preferred terms. At step 1206 a question is asked as to whether another section is present and when answered in the affirmative control is returned to step 1204 where the next section is selected.

Eventually, all of the file sections will have been processed and the question asked at step 1206 will be answered in the negative. At step 1207 section results are processed to select reliable preferred terms. After data association at step 1207, the data is stored at step 1210 with its associated preferred terms and data pointers associated with the preferred terms are updated at step 1211.

A plurality of possible techniques are available for dividing large files into a plurality of sections. Firstly, the file could be divided on strict arithmetic grounds with section boundaries being equally spaced and derived purely on a character count. Thus, sections could be divided at two thousand characters or, more consistent with data storage environments, they could be divided at two kilo-bytes; equivalent to one thousand and twenty-four characters.

Alternatively, the file may itself be structured with headings and sub-headings etc. Thus, it may be preferable to divide the file at the start of headings or, if this is not possible, at the start of sub-headings. Experience has shown that the procedures are more effective if the file is divided at positions related to its actual content.

Figure 13:
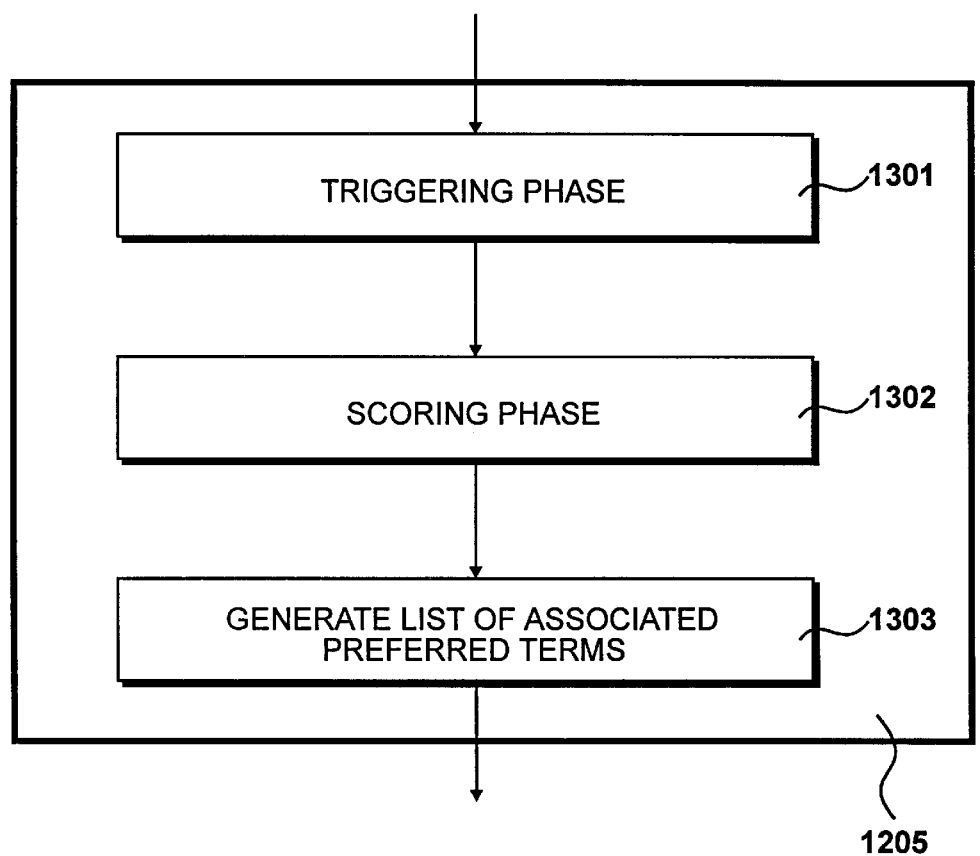
FIG. 13 details the processing of a section to obtain a list of associated preferred terms identified in FIG. 12.

Procedures 1205 for the processing of sections to obtain lists of associated preferred terms are detailed in FIG. 13. The overall processing is broken down into three major phases, consisting of a triggering phase at 1301, followed by a scoring phase at 1302 followed finally by a list generation phase at step 1303.

Figure 14:
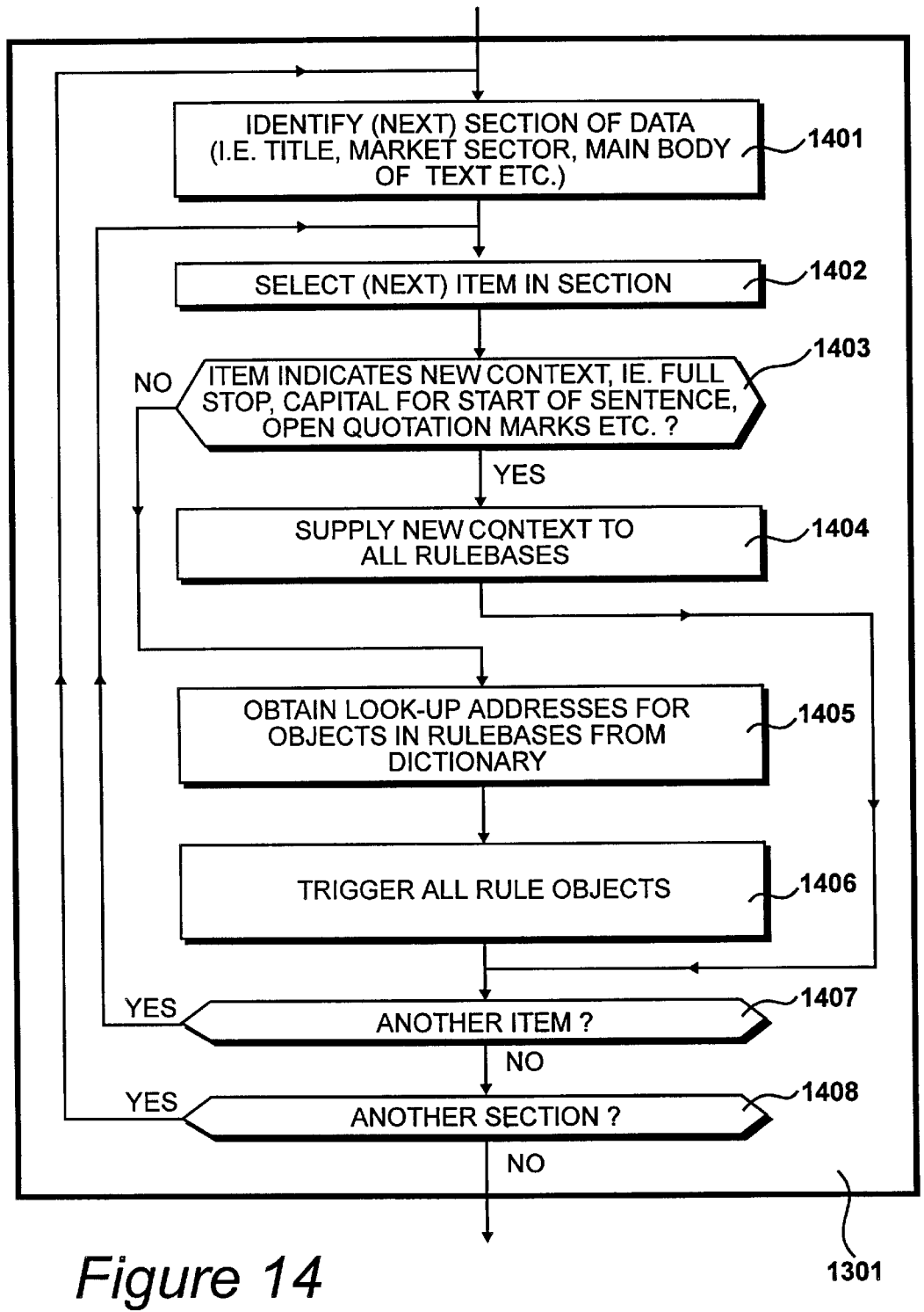
FIG. 14 details a triggering phase identified in FIG. 13.

Triggering phase 1301 is detailed in FIG. 14. At step 1401 a section of the data, such as its title, market sector or main body of text, is identified and at step 1402 an item of the identified section is selected. At step 1403 a question is asked as to whether the item indicates a new context, which may be considered as a grammatical marker in the form of a full stop, capital, start of a sentence or quotation marks et cetera. When answered in the affirmative new context information is supplied to all rulebases 1101 to 1109 at step 1404 and control is then directed to step 1407.

If the question asked at step 1403 is answered in the negative, step 1404 is bypassed and a look-up address is obtained for rule objects in rulebases from the dictionary at step 1405. Thereafter, at step 1406 all addressed objects are triggered and a multiplication of scores is effected by a score weighting factor. Thereafter, at step 1407 a question is asked as to whether another item is present and when answered in the affirmative control is returned to step 1402.

Eventually all of the items for a selected section will have been considered resulting in the question asked at step 1407 being answered in the negative. Thereafter, at step 1408 a question is asked as to whether another section is to be considered and when answered in the affirmative control is returned to step 1401. At step 1401 the next section is identified and steps 1402 to 1408 are repeated. Eventually, all of the sections will have been considered and the question asked at step 1408 will be answered in the negative.

As shown in FIG. 8 each lowest level leaf of the hierarchical tree has a numerical value associated with the identification of a particular item, as identified generally at 803. If the amount of data contained within a particular file is less than what would generally be accepted, scores are further adjusted in relation to this size so as to improve the association of files with particular information types. This further adjustment is performed at the lowest leaf level (an example of this being level 803 in FIG. 8) and these leaf values are multiplied by a file weighting factor, derived from the size of the file, which is triggered at step 1406 as shown in FIG. 14.

Figure 15:
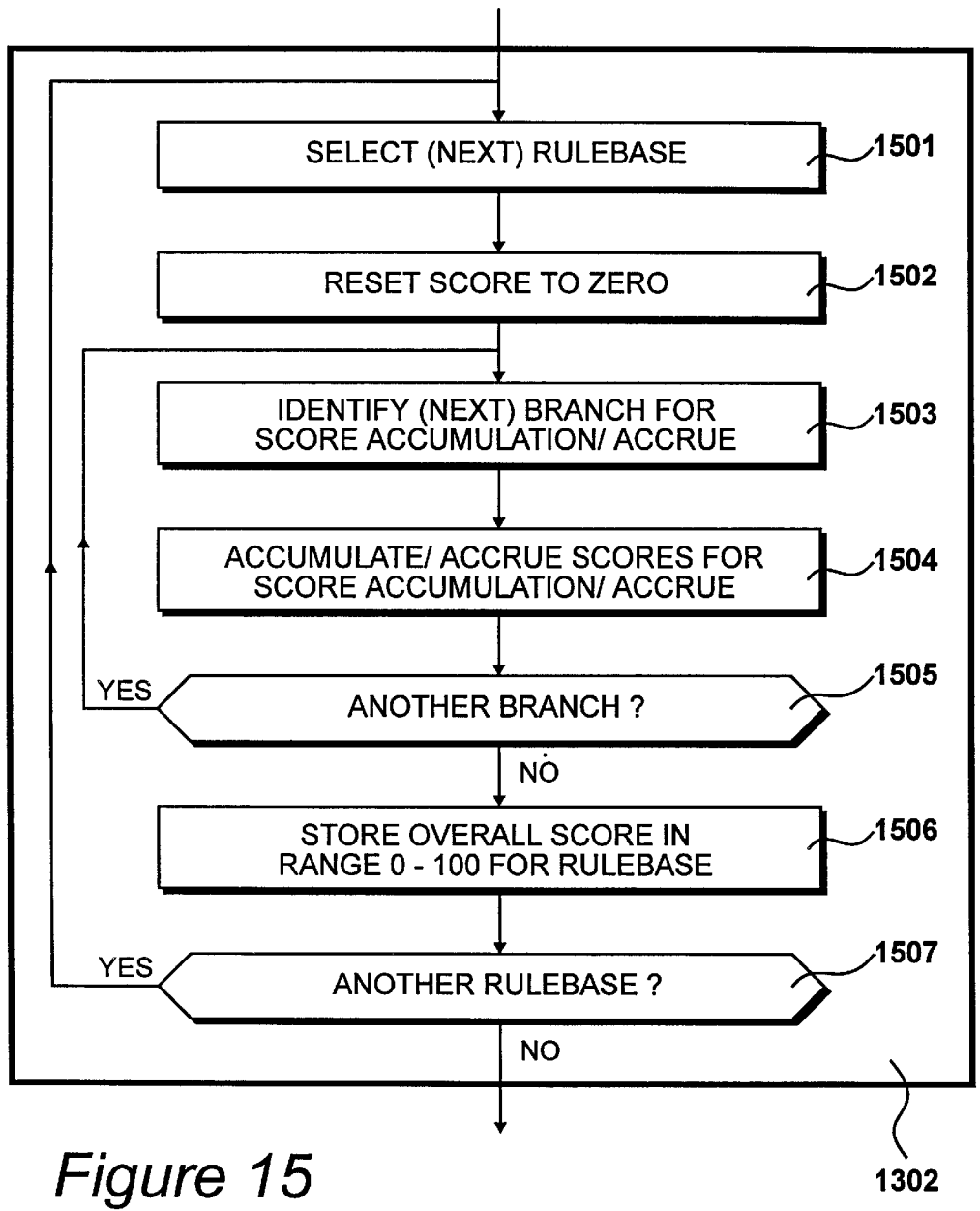
FIG. 15 details a scoring phase identified in FIG. 13.

Scoring phase 1302 is detailed in FIG. 15. At step 1501 a rulebase is selected and at step 1502 a score variable is re-set to zero. At step 1503 a branch is identified for score accumulation/accrue and at step 1504 scores are accumulated or accrued from triggered rules attached to the branch. At step 1505 a question is asked as to whether another branch is to be considered and when answered in the affirmative control is returned to step 1503. A next branch is selected at step 1503 with procedure 1504 being repeated. Eventually all of the branches will have been considered resulting in the question asked at step 1505 being answered in the negative.

At step 1506 an overall score in the range of zero to one hundred is stored for the rulebase and at step 1507 a question is asked as to whether another rulebase is present. When answered in the affirmative control is returned to step 1501 and steps 1501 to 1507 are repeated. Eventually, all of the rulebases will have been considered and the question asked at step 1507 will be answered in the negative.

Figure 16:
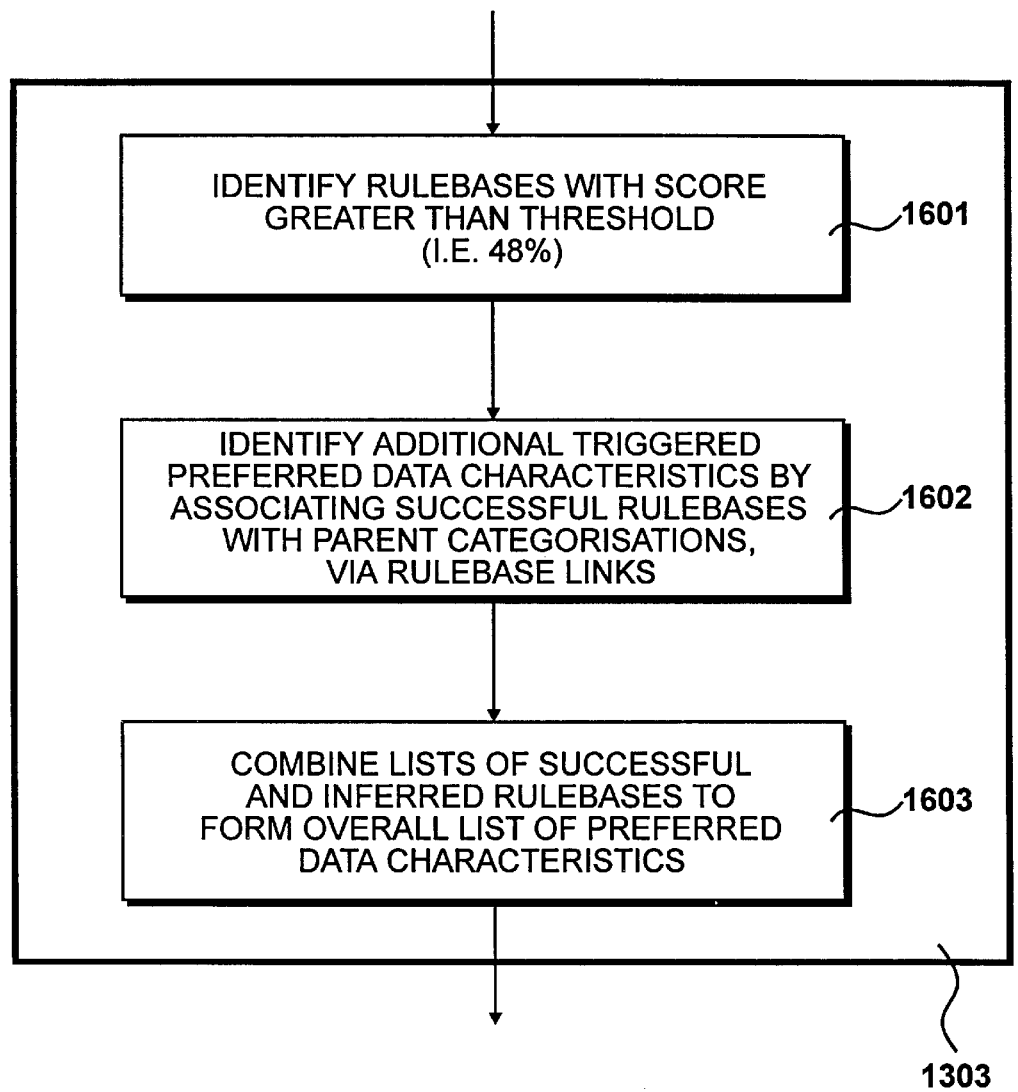
FIG. 16 details a list generation phase identified in FIG. 13.

Phase 1303 for the generation of a list of associated preferred terms is detailed in FIG. 16. At step 1601 a rulebase is identified having a score greater than a predetermined threshold. Thus, for a particular application a threshold may be set at forty-eight percent. At step 1602 additional triggered preferred data characteristics are identified by associating successful rulebases with parent categorisations by rulebase links.

At step 1603 lists of successful and inferred rulebases are combined to form overall lists of preferred data characteristics. Step 1603 results in data being generated by a subsidiary processor, such as processor 311, which is then supplied back to the central processing system 305 over interface 325.

Figure 17:
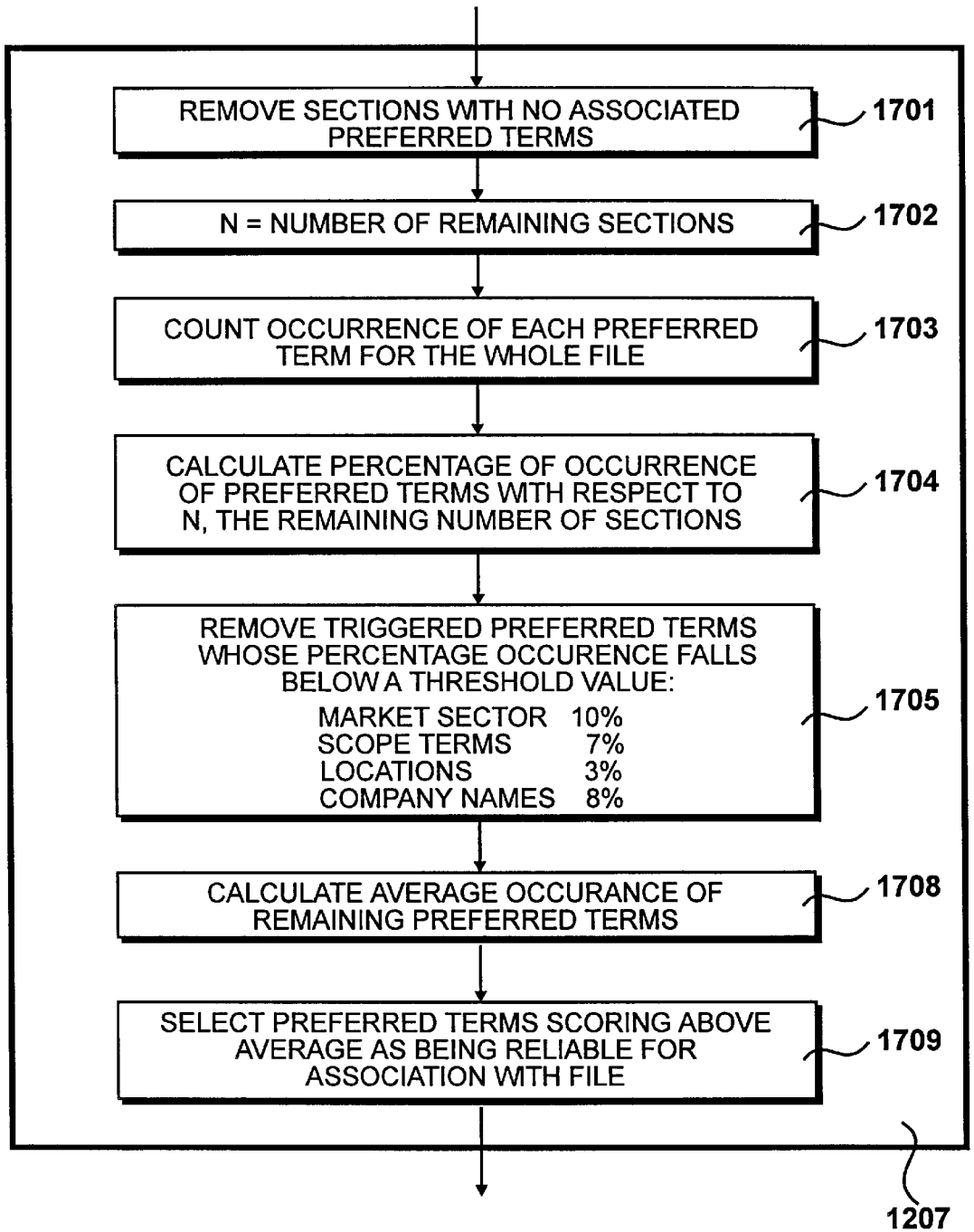
FIG. 17 details the processing of section results identified in FIG. 12.

Process 1207 for the processing of section results to select reliable preferred terms is detailed in FIG. 17. At step 1701 sections with no associated preferred terms are removed from the scoring process, that is to say they are ignored and at step 1702 a variable N is set equal to the number of remaining sections.

At step 1703 the number of occurrences for each preferred term is counted for the file as a whole, that is to say, individual counts for each set of occurrences are combined. At step 1704 a percentage of occurrences of preferred terms is calculated with respect to N, as calculated at step 1702. Thereafter, at step 1705 triggered preferred terms are removed if their percentage occurrence falls below a threshold value, defined in terms of the percentage number of times a category should be triggered.

A category could be triggered by each of the sections therefore the total number of possible triggers is equivalent to the number N of remaining sections. Thus, a percentage occurrence value is given by the number of sections which did trigger a particular category divided by the total number of sections then multiplied by one hundred.

The purpose of step 1705 is to remove associations that may be considered as mistakes. Such associations are identified as mistakes if categories are triggered by only relatively few of the individual sections. Process 1701 and process 1705 both remove associations to preferred terms and it is possible that too many associations may be have been removed, a situation that is likely to occur if the section size selected is too small.

At step 1708 the average occurrence of the remaining preferred terms is calculated and at step 1709 preferred terms scoring above the average calculated at step 1708 are selected as being reliable for association with the original large file. As an alternative to rejecting associations falling below the average at step 1709, such associations may be retained as possibly reliable associations in addition to the reliable associations.

Referring to FIG. 18, the preferred term "OIL_INDUSTRY" is shown in first column 1801 associated to a pointer 0F8912 in column 1802. Address 0F8912 is the first in column 1901 of a linked list shown in FIG. 19. Column 1902 identifies a particular file name and column 1903 identifies the next pointer in the list. Thus, entry 0F8912 points to a particular file with the file name "OIL_INDUSTRY_NETHERLAND_3" with a further pointer to memory location 0F8A20. At memory location 0F8A20 a new file name is provided, illustrated at column 1902 and again a new pointer is present at column 1903. Eventually, all relevant files will have been considered and the end of the list is identified by address 000000 at the pointer location in column 1903.

In an active system, the database 323 will be continually updated and users will continually be given access to the database, all under the control of the central processing system 305. Thus, with reference to FIG. 2, it should be understood that the association step illustrated at 203 and the searching step at 204 are actually concurrent and will be effected in response to the availability of data and the demand for searching respectively.

Figure 20:
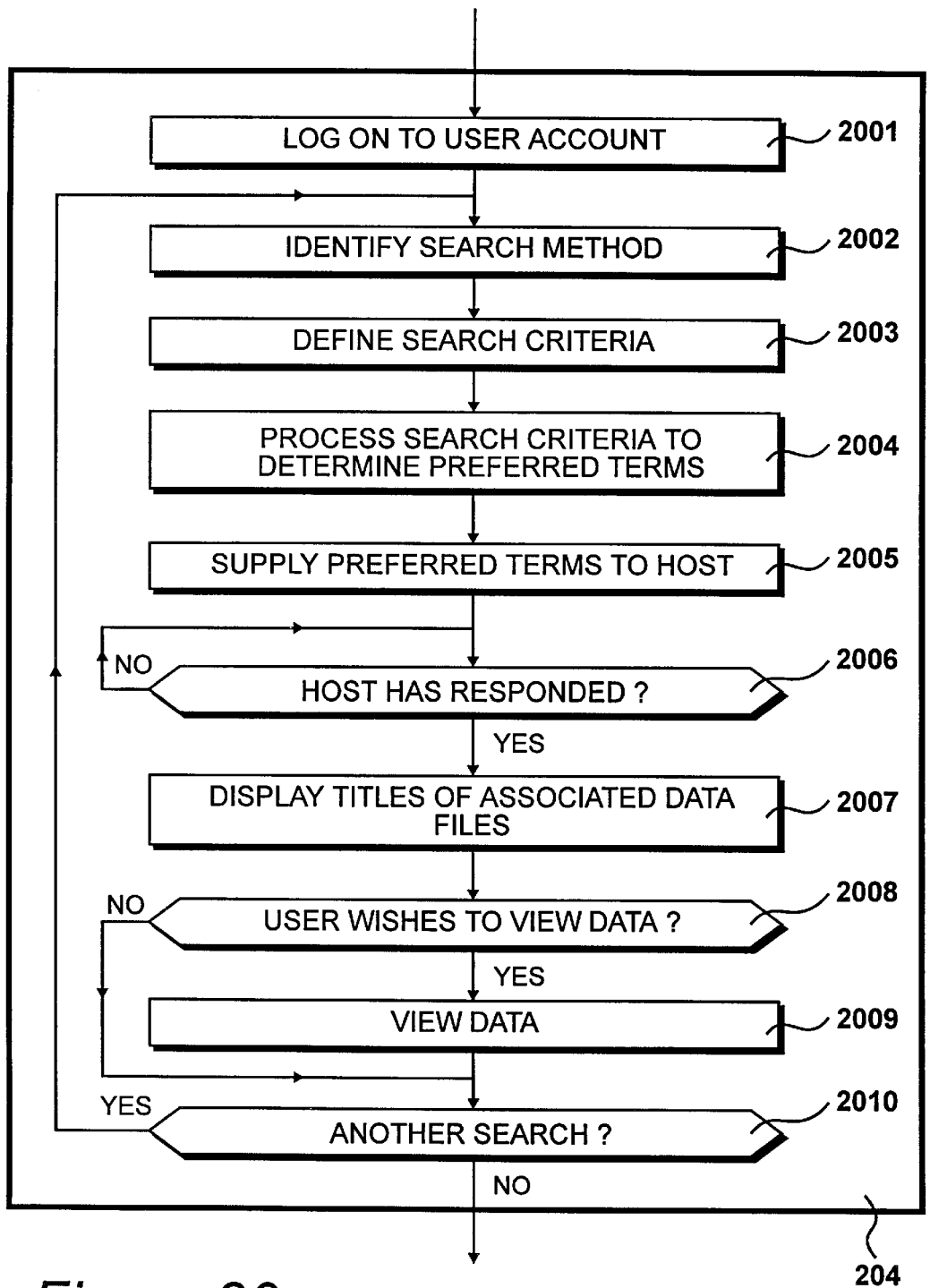
FIG. 20 details procedures for performing a search identified in FIG. 2.

Procedures 204 for performing a search in response to a user request are detailed in FIG. 20. At step 2001 a user logs onto the system and at step 2002 a search method is identified. At step 2003 search criteria are defined and at step 2004 search criteria are processed to determine preferred terms. At step 2005 a list of preferred terms are supplied to the central processing system 305.

At step 2006 a question is asked as to whether the host has responded and when answered in the affirmative titles of associated data files are displayed at step 2007.

At step 2008 a question is asked as to whether the user wishes to view identified data and when answered in the affirmative the data is viewed; after being downloaded over the communication channel, at step 2009.

At step 2010 a question is asked as to whether another search is to be performed and when answered in the affirmative control is returned to step 2002.

Figure 21:
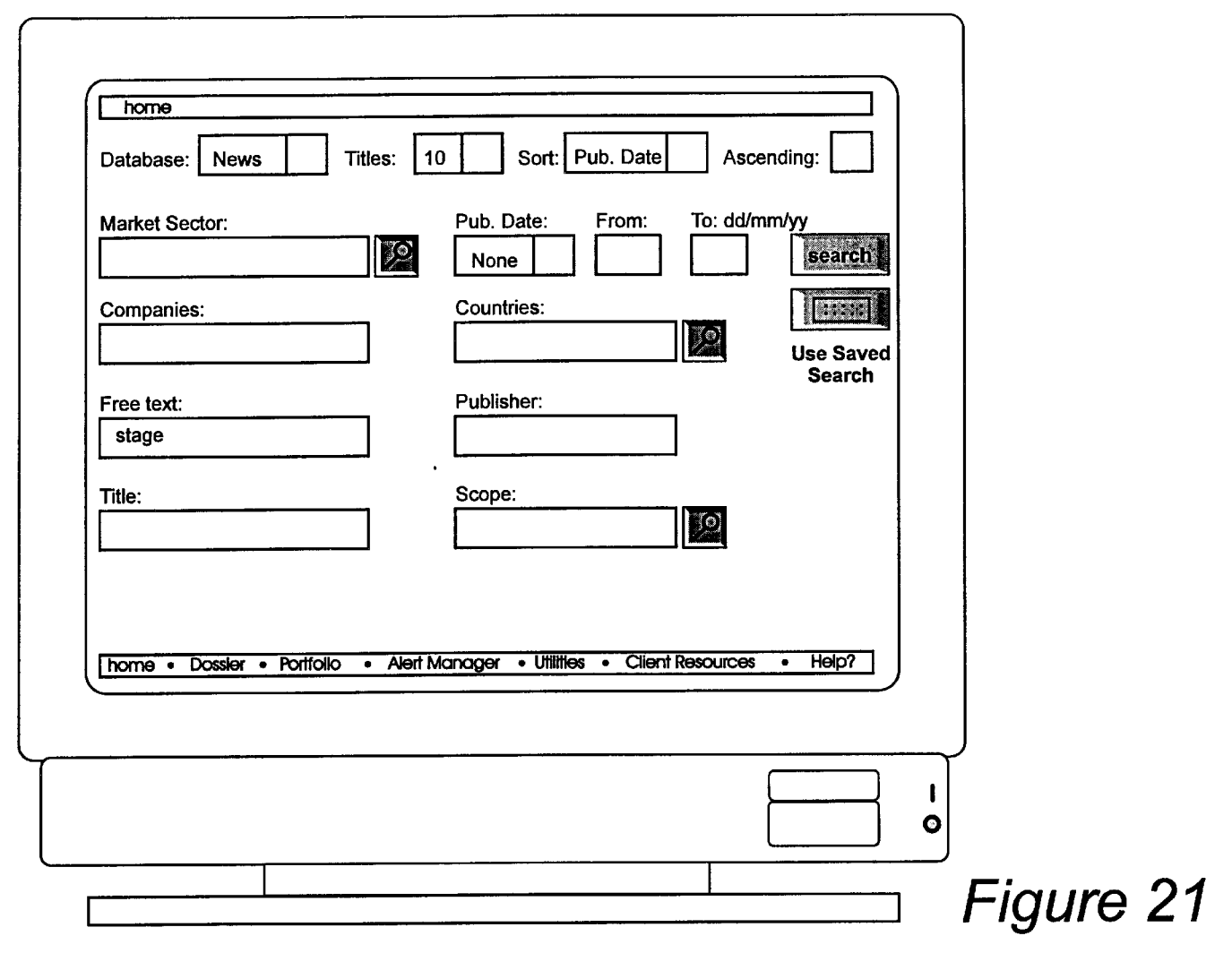

Step 2002 requires the search method to be identified and in order to achieve this a user is prompted by a screen display of the type shown in FIG. 21. Thus, a plurality of text boxes are presented to the user inviting the user to specify a search method.

Figure 22:
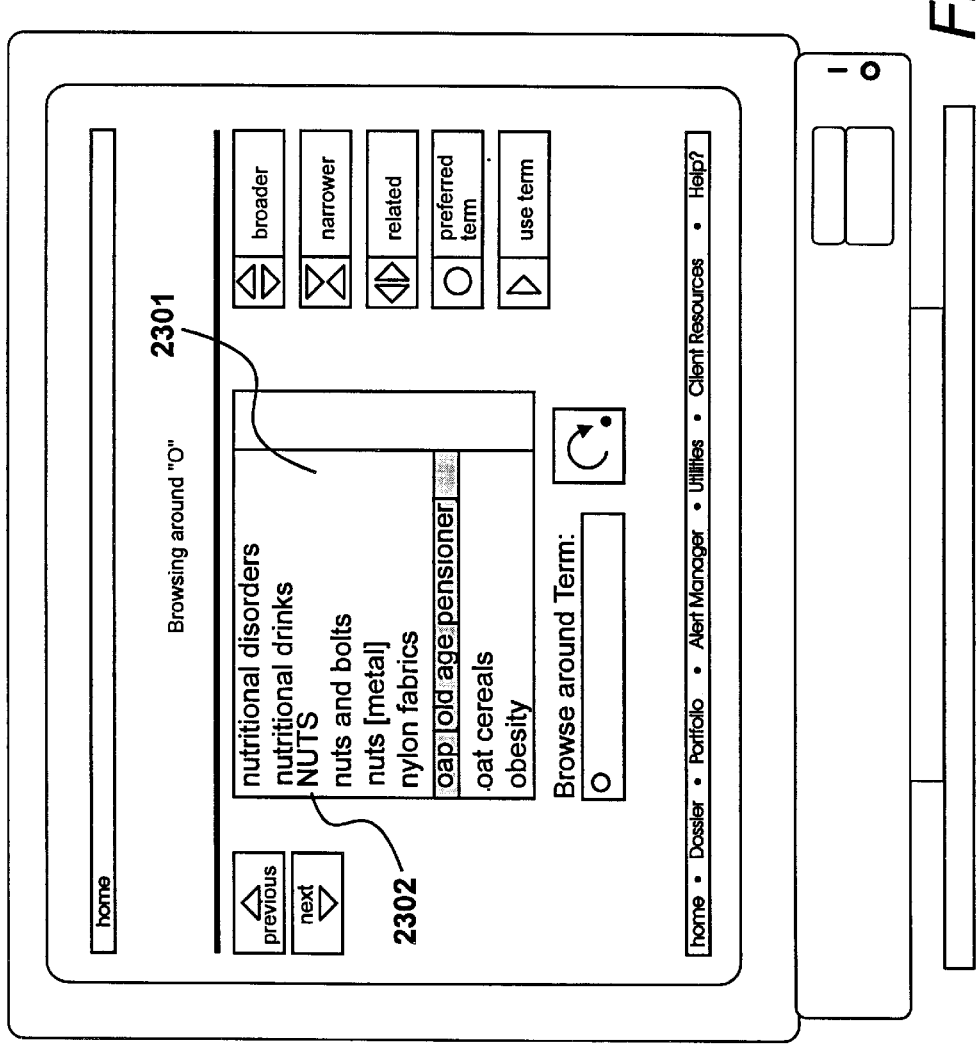
FIG. 22 details a screen display prompting a user for search criteria.

Step 2003 for the defining of search criteria results in the user being prompted by a screen of the type shown in FIG. 22. Terms providing a basis for the user's search are displayed in a window 2201. Preferred terms are displayed in uppercase characters, such as the entry shown at position 2202.

The displaying of titles of associated files at step 2007 results in the user seeing information displayed of the type illustrated in FIG. 23. Each entry, such as entry 2301, includes a check box 2302. Check boxes 2302 allow a particular item to be selected by a user such that the actual information file may be supplied to the user from the central database over a communication channel.

What I claim is:

1. Apparatus configured to associate data files of a size greater than a predetermined size with predetermined information categories, comprising:

dividing means configured to divide an input data file into a plurality of file sections having a size substantially consistent with a first preferred size;

categorizing means configured to categorize each of said file sections with respect to the predetermined information categories to produce provisional sets of category associations; and processing means, configured to process said provisional sets of category associations to produce an output set of category associations for the input data file;

said processing means being configured to remove altogether sections with no associations or with very few associations and to determine whether too few associated sections remain and instruct operation of said dividing means and said categorizing means again with a second preferred size larger than said first preferred size.

2. Apparatus according to claim 1, wherein said dividing means is configured to divide files into file sections each having a size substantially consistent with a preferred size, wherein said preferred size is smaller than said predetermined size.

3. Apparatus according to claim 1, wherein said dividing means is configured to remove tables from a data file before dividing said file into sections.

4. Apparatus according to claim 1, wherein said processing means is configured to determine the desirability to increase size sections, and, if such a determination is made, said dividing means is instructed to increase size sections and repeat the dividing process.

5. Apparatus according to claim 1, including data sources arranged to continually supply data for association.

6. Apparatus according to claim 1, wherein said categorising means is configured to categorise each file section by processing a section in combination with association files.

7. Apparatus according to claim 1, including searching means configured to search categories in response to a user request.

8. Apparatus according to claim 7, including output means configured to supply output information identifying files selected by said search.

9. A method of associating data files of a size greater than a predetermined size with predetermined information categories, comprising the steps of:

dividing an input data file into a plurality of file sections each having a size substantially consistent with a first preferred size;

categorizing each of said file sections with respect to the predetermined information categories to produce provisional sets of category associations; and processing said provisional sets of category associations to produce an output set of category associations for the input data file;

removing altogether sections with no associations or with very few associations and determining whether too few associated sections remain and dividing and categorizing again with a second preferred size larger than the first preferred size.

10. A method according to claim 9, wherein said preferred size is smaller than said predetermined size.

11. A method according to claim 9, wherein tables are removed from a data file before said file is divided into sections.

12. A method according to claim 9, wherein an assessment is made as to the desirability to increase size sections, whereafter the size of said section are increased and the dividing process is repeated.

13. A method according to claim 9, wherein data files are continually received from data sources.

14. A method according to claim 9, wherein said categorising is performed by processing a data file in combination with association files.

15. A method according to claim 9, wherein categories are searched in response to a user request.

16. A method according to claim 15, wherein information identifying files is generated in response to said search and returned to a requesting user.

17. A computer system programmed to execute stored instructions such that in response to said stored instructions said system is configured to:

divide an input data file into a plurality of file sections having a size substantially consistent with a first preferred size;

categorize each of said file sections with respect to predetermined information categories to produce provisional sets of category associations;

process said provisional sets of category associations to produce an output set of category associations for the input data file; and remove altogether sections with no associations or with very few associations, determine whether too few associated sections remain and divide and categorize again with a second preferred size larger than the first preferred size.

18. A computer system programmed to execute stored instructions according to claim 17, configured to divide files into file sections each having a size substantially consistent with a preferred size, wherein said preferred size is smaller than said predetermined size.

19. A computer system programmed to execute stored instructions according to claim 17, configured to remove tables from a data file before dividing said file into sections.

20. A computer system programmed to execute stored instructions according to claim 17, configured to determine the desirability to increase size sections and, if such a determination is made, to increase size sections and to repeat the dividing process.

21. A computer system programmed to execute stored instructions according to claim 17, configured to continually supply data for association.

22. A computer system programmed to execute stored instructions according to claim 17, configured to categories each file section by processing a section in combination with association files.

23. A computer system programmed to execute stored instructions according to claim 17, configured to search categories in response to a user request.

24. A computer system programmed to execute stored instructions according to claim 23, configured to supply output information identifying files selected by said search.

25. A computer-readable medium having computer-readable instructions executable by a computer such that, when executing said instructions, a computer will perform the steps of:

dividing an input data file into a plurality of file sections each having a size substantially consistent with a first preferred size;

categorizing each of said file sections with respect to predetermined information categories to produce provisional sets of category associations; and processing said provisional sets of category associations to produce an output set of category associations for the input data file;

removing altogether sections with no associations or with very few associations and determining whether too few associated sections remain and dividing and categorizing again with a second preferred size larger than the first preferred size.

26. A computer-readable medium having computer-readable instructions according to claim 1, such that when executing said instructions a computer also performs the step of removing tables from a data file before dividing the file into sections.

27. A computer-readable medium having computer-readable instructions according to claim 25, such that when executing said instructions a computer will also perform the steps of assessing the desirability to increase the size of file sections and, where appropriate, increasing the size of said sections and repeating the file division process.

28. A computer-readable medium having computer-readable instructions according to claim 25, such that when executing said instructions a computer will also perform the step of searching categories in response to user requests.

29. A computer-readable medium having computer-readable instructions according to claim 28, such that when executing said instructions a computer will also perform the step of generating information identifying files in response to said search and returning said identifying information to a requesting user.

30. An apparatus configured to associate files of data of a size greater than a predetermined size, comprising:

dividing means configured to divide a file into a plurality of file sections having a size substantially consistent with a preferred size;

categorizing means configured to categorize each of said file sections in combination with association files to produce sets of section associations;

processing means, configured to process said sets of section associations to produce a set of category associations for the original undivided file; and storage means for storing said association files as outline files.

31. The apparatus of claim 30 wherein each of said stored outline files relates to a respective category.

32. A method of associating files of data of a size greater than a predetermined size, comprising the steps of:

dividing a file into a plurality of file sections each having a size substantially consistent with a preferred size;

categorizing each of said file sections in combination with association files to produce sets of section associations;

processing said sets of section associations to produce a set of category associations for the original undivided file; and storing the association files as outline files.

33. The method of claim 32 wherein each association file relates to a respective category.

34. A computer system programmed to execute stored instructions such that in response to said stored instructions said system is configured to:
- divide a file into a plurality of file sections having a size substantially consistent with a preferred size;
- categorize each of said file sections in combination with association files to produce sets of section associations; and
- process said sets of section associations to produce a set of category associations for the original undivided file.

35. The computer system of claim 34 wherein the system is configured to store an outline file relating to each category for which association is required.

36. A computer-readable medium having computer-readable instructions executable by a computer such that, when executing said instructions, a computer will perform the steps of:
- dividing a file into a plurality of file sections each having a size substantially consistent with a preferred size;
- categorizing each of said file sections in combination with association files to produce sets of section associations;
- processing said sets of section associations to produce a set of category associations for the original undivided file; and
- said association files preferably being stored in the form of outline files.

* * * * *